US012802996B2

(12) United States Patent
Wang et al.

(10) Patent No.: US 12,802,996 B2
(45) Date of Patent: Nov. 17, 2026

(54) POSITIVE ELECTRODE PLATE, SECONDARY BATTERY AND PREPARATION METHOD THEREOF AND BATTERY MODULE, BATTERY PACK AND POWER CONSUMING DEVICE COMPRISING THE SECONDARY BATTERY

(71) Applicant: CONTEMPORARY AMPEREX TECHNOLOGY (HONG KONG) LIMITED, Hong Kong (CN)

(72) Inventors: Bangrun Wang, Ningde City (CN); Haotian Xie, Ningde City (CN); Na Liu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 699 days.

(21) Appl. No.: 18/167,065

(22) Filed: Feb. 9, 2023

(65) Prior Publication Data

US 2023/0387416 A1 Nov. 30, 2023

Related U.S. Application Data

(63) Continuation of application No. PCT/CN2021/106931, filed on Jul. 16, 2021.

(51) Int. Cl.

*H01M 4/62* (2006.01)
*H01M 4/04* (2006.01)

(Continued)

(52) U.S. Cl.

CPC ......... *H01M 4/623* (2013.01); *H01M 4/0404* (2013.01); *H01M 4/505* (2013.01);

(Continued)

(58) Field of Classification Search

None

See application file for complete search history.

(56) References Cited

U.S. PATENT DOCUMENTS

2018/0355206 A1* 12/2018 Bizet .................... C09D 127/16
2021/0057721 A1* 2/2021 Kawasaki ............ H01M 4/622

(Continued)

FOREIGN PATENT DOCUMENTS

CN 105244505 A 1/2016
CN 105702913 A 6/2016

(Continued)

OTHER PUBLICATIONS

CN 112259803 A Machine Translation (Year: 2021).*

(Continued)

*Primary Examiner* — Mark Ruthkosky
*Assistant Examiner* — Sarah J Jacobson
(74) *Attorney, Agent, or Firm* — K&L Gates LLP

(57) ABSTRACT

A positive electrode plate is provided. The positive electrode plate comprises a positive electrode current collector, a positive electrode active material layer provided on at least one surface of the positive electrode current collector, and a lithium supplementing layer provided on a surface of the positive electrode active material layer opposite to the positive electrode current collector. The lithium supplementing layer comprises a positive electrode lithium supplementing material, a conductive agent and a binder A, the positive electrode lithium supplementing material comprises a lithium-rich metal oxide, and the binder A is selected from polymers containing a first monomer unit shown by a formula I and a second monomer unit shown by a formula II, where the $R^1$, $R^2$, $R^3$, $R^4$, $R^5$ and $R^6$ are each independently selected from hydrogen or substituted or unsubsti- (Continued)

tuted C1 to C8 alkyl, and the R is selected from substituted or unsubstituted C1 to C8 alkyl.

I

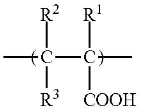

II

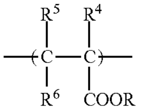

20 Claims, 2 Drawing Sheets

(51) Int. Cl.

| | |
|---|---|
| ***H01M 4/505*** | (2010.01) |
| ***H01M 4/525*** | (2010.01) |
| ***H01M 10/0568*** | (2010.01) |
| *H01M 4/02* | (2006.01) |

(52) U.S. Cl.

CPC ....... *H01M 4/525* (2013.01); *H01M 10/0568* (2013.01); *H01M 2004/021* (2013.01); *H01M 2004/028* (2013.01)

(56) References Cited

U.S. PATENT DOCUMENTS

| | | | | |
|---|---|---|---|---|
| 2023/0299281 | A1* | 9/2023 | Chen | H01M 4/131<br>429/231.95 |
| 2024/0097135 | A1* | 3/2024 | Shibata | H01G 11/50 |

FOREIGN PATENT DOCUMENTS

| | | | | |
|---|---|---|---|---|
| CN | 108232343 A | | 6/2018 | |
| CN | 110429252 A | | 11/2019 | |
| CN | 110729451 A | | 1/2020 | |
| CN | 110767880 A | | 2/2020 | |
| CN | 111834622 A | | 10/2020 | |
| CN | 112259803 A | * | 1/2021 | H01M 10/0583 |
| CN | 112436194 A | | 3/2021 | |
| CN | 112599928 A | | 4/2021 | |
| JP | H11149929 A | * | 6/1999 | |
| JP | 2004281055 A | | 10/2004 | |
| JP | 2014165108 A | | 9/2014 | |
| WO | 2011078212 A1 | | 6/2011 | |
| WO | 2021012768 A1 | | 1/2021 | |
| WO | 2021088168 A1 | | 5/2021 | |
| WO | WO-2022012357 A1 | * | 1/2022 | H01M 4/667 |

OTHER PUBLICATIONS

Effects of Particle Size Distribution on Compacted Density of Lithium Iron Phosphate 18650 Battery (Year: 2018).*

High-Voltage Single-Crystal Cathode Materials for Lithium-Ion Batteries (Year: 2021).*

JPH 11149929 A Machine Translation (Year: 1999).*

WO 2022012357 A1 Machine Translation (Year: 2022).*

The extended European search report received in the corresponding European Application 21942132.8, mailed on Jun. 11, 2024.

M. Akhilash: "A journey through layered cathode materials for lithium ion cells—From lithium cobalt oxide to lithium-rich transition metal oxides", Journal of Alloys and Compounds, vol. 869, Jul. 1, 2021 (Jul. 1, 2021), p. 159239, XP093166488, CH.

International Search Report received in the corresponding International Application PCT/CN2021/106931, mailed Apr. 13, 2022.

The first office action received in the counterpart CN Application No. 202180078562.6, dated Sep. 6, 2025, 16 pages with English translation.

* cited by examiner

POSITIVE ELECTRODE PLATE, SECONDARY BATTERY AND PREPARATION METHOD THEREOF AND BATTERY MODULE, BATTERY PACK AND POWER CONSUMING DEVICE COMPRISING THE SECONDARY BATTERY

CROSS-REFERENCE TO RELATED APPLICATIONS

The present application is a continuation of International Application PCT/CN2021/106931, filed Jul. 16, 2021 and entitled "POSITIVE ELECTRODE PLATE, SECONDARY BATTERY AND PREPARATION METHOD THEREOF AND BATTERY MODULE, BATTERY PACK AND POWER CONSUMING DEVICE COMPRISING THE SECONDARY BATTERY", which is incorporated herein by reference in its entirety.

TECHNICAL FIELD

The present application belongs to the technical field of batteries, and in particular relates to a positive electrode plate, a secondary battery and a preparation method thereof and a battery module, a battery pack and a power consuming device comprising the secondary battery.

BACKGROUND ART

In recent years, secondary batteries have been widely used in energy storage power systems such as hydroelectric, thermal, wind and solar power plants, as well as electric tools, electric bicycles, electric motorcycles, electric vehicles, military equipment, aerospace, electronic products and other fields. With the increasingly extensive use of secondary batteries, there are higher requirements on their capacity performance and cycle performance.

However, during the first charge process of a secondary battery, a SEI (solid electrolyte interface) film is inevitably formed on its negative electrode, causing consumption of active ions; and consequent irreversible capacity loss is difficult to eliminate, thereby reducing the first discharge capacity and bringing challenges to the improvement of the cycle life of the secondary battery.

SUMMARY OF THE INVENTION

The present application has been made in view of the above-mentioned problems, and an objective of the present application is to provide a positive electrode plate that enables a secondary battery to obtain a high first discharge capacity and a long cycle life. Another objective of the present application is to provide a secondary battery with a high first discharge capacity and a long cycle life, and a preparation method thereof. Yet another objective of the present invention is to provide a battery module, a battery pack and a power consuming device comprising a secondary battery of the present invention.

In order to achieve the above-mentioned objectives, a first aspect of the present application provides a positive electrode plate, comprising a positive electrode current collector, a positive electrode active material layer provided on at least one surface of the positive electrode current collector, and a lithium supplementing layer provided on a surface of the positive electrode active material layer opposite to the positive electrode current collector, wherein the lithium supplementing layer comprises a positive electrode lithium supplementing material, a conductive agent and a binder A, the positive electrode lithium supplementing material comprises a lithium-rich metal oxide, and the binder A is selected from polymers containing a first monomer unit shown by a formula I and a second monomer unit shown by a formula II,

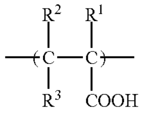
I

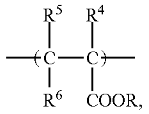
II $R^1$, $R^2$, $R^3$, $R^4$, $R^5$ and $R^6$ are each independently selected from hydrogen or substituted or unsubstituted C1 to C8 alkyl, and R is selected from substituted or unsubstituted C1 to C8 alkyl.

In the present application, by providing the lithium supplementing layer on a surface of the positive electrode active material layer opposite to the positive electrode current collector, it is beneficial for the positive electrode lithium supplementing material to release more lithium ions and for the de-intercalated active lithium to migrate to a negative electrode for lithium supplementation. By using a polymer containing a first monomer unit and a second monomer unit as a binder in the lithium supplementing layer, free lithium compounds such as LiGH and $Li_2CO_3$ on the surface of the lithium-rich metal oxide can be consumed, so as to effectively improve the problem of slurry gelation and ensure the formation of a tight binding between the lithium supplementing layer and the positive electrode active material layer. In addition, this can effectively avoid excessive carboxyl group in the binder from reacting with the active lithium ions, which is helpful for the positive electrode lithium supplementing material to release more lithium ions in a charging process, and ensures that more lithium ions are used for lithium supplementation. Therefore, the positive electrode lithium supplementing material in the positive electrode plate of the present application can achieve a high utilization rate of active lithium, so that the first charge/discharge capacity and energy density of the battery can improved and the battery is enabled to obtain a long cycle life. Further, The positive electrode plate of the present application can have good electron conduction performance and lithium ion transport performance after lithium deintercalation of the lithium supplementing layer, and thus the cycle life of a secondary battery using the same can further improved.

In any embodiment of the present application, based on the total weight of the first monomer unit and second monomer unit, the content of the first monomer unit is 30% to 70%, and optionally 40% to 60%. When the binder A contains an appropriate amount of the first monomer unit and second monomer unit, the first charge/discharge capacity and cycle life of the battery can be further improved.

In any embodiment of the present application, the weight-average molecular weight of the binder A is 30,000 to 600,000, optionally 50,000 to 500,000, and still optionally 100,000 to 300,000. When the molecular weight of the binder A is in an appropriate range, the first charge/discharge capacity and cycle life of the battery can be further improved.

In any embodiment of the present application, the first monomer unit satisfies that: $R^1$, $R^2$ and $R^3$ are each independently selected from hydrogen or substituted or unsubstituted C1 to C4 alkyl. Optionally, $R^1$, $R^2$ and $R^3$ are each independently selected from hydrogen or methyl.

In any embodiment of the present application, the first monomer unit comprises one or more of the monomer units shown by a formula S1 and a formula S2.

S1

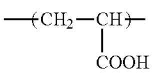

S2

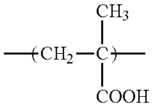

In any embodiment of the present application, the second monomer unit satisfies that: and R is selected from substituted or unsubstituted C1 to C4 alkyl.

In any embodiment of the present application, the second monomer unit satisfies that $R^4$, $R^5$ and $R^6$ are each independently selected from hydrogen or substituted or unsubstituted C1 to C4 alkyl. Optionally, $R^4$, $R^5$ and $R^6$ are each independently selected from hydrogen or methyl. Still optionally, $R^4$ represents hydrogen or methyl, and $R^5$ and $R^6$ both represent hydrogen.

In any embodiment of the present application, the second monomer unit comprises one or more of the monomer units shown by formulas S3 to S8.

S3

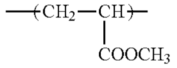

S4

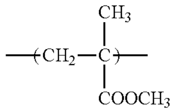

S5

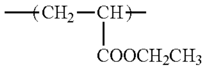

S6

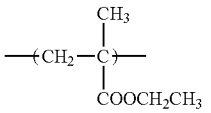

S7

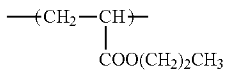

S8

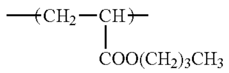

In any embodiment of the present application, the binder A is selected from one or more of a polymer containing monomer units S1 and S5, a polymer containing monomer units S1 and S8, a polymer containing monomer units S1, S5 and S8, a polymer containing monomer units S1, S3, S5 and S8, a polymer containing monomer units S2 and S8, a polymer containing monomer units S2 and S7, a polymer containing monomer units S2 and S5, and a polymer containing monomer units S2 and S6. In some embodiments, the binder A is selected from one or more of a polymer of monomer units S1 and S5, a polymer of monomer units S1 and S8, a polymer of monomer units S1, S5 and S8, a polymer of monomer units S1, S3, S5 and S8, a polymer of monomer units S2 and S8, a polymer of monomer units S2 and S7, a polymer of monomer units S2 and S5, and a polymer of monomer units S2 and S6. When a suitable binder A is selected, the first charge/discharge capacity and cycle life of the battery be can further improved.

In any embodiment of the present application, the pH of the positive electrode lithium supplementing material measured by the titration method is ≤13. Optionally, pH≤12.5. Further optionally, 11≤pH≤12.5. When the pH of the positive electrode lithium supplementing material is in the above-mentioned range, it is beneficial to further improve the lithium supplementing effect, thereby improving the first charge/discharge capacity and cycle life of the battery.

In any embodiment of the present application, the gram capacity of the positive electrode lithium supplementing material is ≥400 mAh/g, and optionally ≥500 mAh/g. When the positive electrode lithium supplementing material has a high gram capacity, the first charge/discharge capacity and cycle life of the battery can be further improved.

In any embodiment of the present application, the lithium-rich metal oxide is selected from one or more of $Li_3M^1O_4$, $Li_5M^2O_4$ and $Li_6M^3O_4$, wherein $M^1$ comprises one or more of V, Nb, Cr and Mo, $M^2$ comprises one or more of Fe, Cr, V, Mo and Al, $M^3$ comprises one or more of Co, V, Cr and Mo, and the valence of each metal element except Li in the lithium-rich metal oxide is lower than its own highest oxidation valence. Optionally, the lithium-rich metal oxide is selected from one or more of $Li_3VO_4$, $Li_3NbO_4$, $Li_5FeO_4$ and $Li_6CoO_4$.

In any embodiment of the present application, the lithium-rich metal oxide comprises monocrystal particles, and the number proportion of the monocrystal particles in the lithium-rich metal oxide is 60% to 100%, and optionally 80% to 100%. When the lithium-rich metal oxide is dominated by monocrystal particles, the battery is enabled to obtain a prolonged cycle life and it is beneficial to improve the energy density of the battery.

In any embodiment of the present application, the volume-average particle size $D_v50$ of the lithium-rich metal oxide is 5 μm to 25 μm, optionally 6 μm to 20 μm, and still optionally 10 μm to 15 μm. When the lithium-rich metal oxide also satisfies that $D_v50$ is in an appropriate range, the cycle life and energy density of the battery can be further improved.

In any embodiment of the present application, the weight proportion of the positive electrode lithium supplementing material in the lithium supplementing layer is 90% to 97%, and optionally 92.5% to 95%.

In any embodiment of the present application, the weight proportion of the binder A in the lithium supplementing layer is 2% to 7%, and optionally 3.5% to 5%.

In any embodiment of the present application, the weight proportion of the conductive agent in the lithium supplementing layer is 1% to 3%, and optionally 1.5% to 2.5%.

In any embodiment of the present application, the positive electrode active material layer comprises a binder B and a binder C, wherein the binder B comprises one or more of polyvinylidene fluoride PVDF and polytetrafluoroethylene PTFE, and the binder C is selected from polymers containing one or more from a group consisting of a third monomer unit shown by a formula III and a fourth monomer unit shown by a formula IV. In some embodiments, based on the total weight of the binder B and binder C, the content of the binder C is 5% to 20%. When the positive electrode active material layer contains an appropriate amount of the binder C, the cycle life of the battery can be further improved while ensuring that the battery has a high first charge/discharge capacity.

III

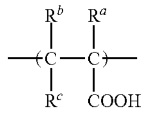

IV

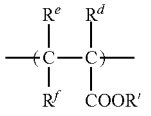

$R^a$, $R^b$, $R^c$, $R^d$, $R^e$ and $R^f$ are each independently selected from hydrogen or substituted or unsubstituted C1 to C8 alkyl, and R' is selected from substituted or unsubstituted C1 to C8 alkyl; and optionally, the third monomer unit comprises one or more of the monomer units shown by the formulas S1 and S2, and the fourth monomer unit comprises one or more of the monomer units shown by the formulas S3 to S8.

In any embodiment of the present application, the weight-average molecular weight of the binder C is 50 to 5,000, and optionally 100 to 4,000. When the weight-average molecular weight of the binder C is in an appropriate range, it is beneficial for the battery to obtain both a high first charge/discharge capacity and a long cycle life.

In some embodiments of the present application, in the positive electrode active material layer, the positive electrode active material comprises a layered lithium transition metal oxide, wherein based on the total weight of the binder B and binder C, the content of the binder C is 10% to 20%. Optionally, the layered lithium transition metal oxide comprises one or more of a lithium-nickel-cobalt-manganese oxide, a lithium-nickel-cobalt-aluminum oxide and modified materials of the forgoing substances. If the positive electrode active material comprises a layered lithium transition metal oxide and the positive electrode active material layer contains an appropriate proportion of the binder C, the first charge/discharge capacity and cycle life of the battery can be further improved.

In some embodiments, the weight-average molecular weight of the binder C is 500 to 4,000, and optionally 1,000 to 3,000. If the positive electrode active material comprises a layered lithium transition metal oxide and the weight-average molecular weight of the binder C is in the given range, the first charge/discharge capacity and cycle life of the battery can be further improved.

In some embodiments, the binder C is selected from polymers containing one or more of the third monomer units. Optionally, the binder C is selected from polymers containing the monomer unit S1. Further optionally, the binder C is selected from polymers of the monomer unit S1. If the positive electrode active material comprises a layered lithium transition metal oxide and the binder C is selected from the above-mentioned polymers, the first charge/discharge capacity and cycle life of the battery can be further improved.

In some embodiments, the compacted density of the positive electrode active material layer is 3.5 g/cm$^3$ to 3.8 g/cm$^3$, and optionally 3.55 g/cm$^3$ to 3.65 g/cm$^3$; wherein the volume-average particle size $D_v50$ of the positive electrode active material is 2 μm to 10 m, and optionally 4 μm to 8 μm. When the positive electrode active material layer obtains a high compacted density, the energy density of the battery can be further improved.

In some other embodiments of the present application, in the positive electrode active material layer, the positive electrode active material comprises a polyanion-type positive electrode material, wherein based on the total weight of the binder B and binder C, the content of the binder C is 5% to 10%. Optionally, the polyanion-type positive electrode material comprises a lithium-containing phosphate with an olivine structure, and may also optionally comprise one or more of lithium iron phosphate, lithium manganese phosphate, lithium iron manganese phosphate and modified materials of the forgoing substances. If the positive electrode active material comprises a polyanion-type positive electrode material and the positive electrode active material layer contains an appropriate proportion of the binder C, the first charge/discharge capacity and cycle life of the battery can be further improved.

In some embodiments, the weight-average molecular weight of the binder C is 100 to 3,000, and optionally 500 to 1,500. If the positive electrode active material comprises a polyanion-type positive electrode material and the weight-average molecular weight of the binder C is in the given range, the first charge/discharge capacity and cycle life of the battery can be further improved.

In some embodiments, the binder C is selected from polymers containing both the third monomer unit and the fourth monomer unit; and optionally, the binder C is selected from one or more of polymers containing at least one selected from the monomer units S1 to S2 and at least one selected from the monomer units S2 to S8. If the positive electrode active material comprises a polyanion-type positive electrode material and the binder C is selected from the above-mentioned polymers, the first charge/discharge capacity and cycle life of the battery can be further improved.

In some embodiments, the compacted density of the positive electrode active material layer is 2.4 g/cm$^3$ to 2.7 g/cm$^3$, and optionally 2.45 g/cm$^3$ to 2.55 g/cm$^3$; wherein the volume-average particle size $D_v50$ of the positive electrode active material is 0.2 μm to 1.5 μm, and optionally 0.5 μm to 1.2 μm. When the positive electrode active material layer obtains a high compacted density, the energy density of the battery can be further improved.

In any embodiment of the present application, based on the total thickness of the positive electrode active material layer and the lithium supplementing layer, the thickness proportion of the lithium supplementing layer is 3% to 22%, optionally 5% to 20%, and still optionally 8% to 15%. When the thickness proportion of the lithium supplementing layer is in an appropriate range, the battery is enabled to obtain a high energy density and a long cycle life.

A second aspect of the present application provides a secondary battery comprising a positive electrode plate, the positive electrode plate comprising a positive electrode plate according to the present application. By using the positive electrode plate of the present application, the secondary battery of the present application can obtain a high first charge/discharge capacity, a high energy density and a long cycle life at the same time.

In any embodiment of the present application, the secondary battery comprises an electrolyte solution. The electrolyte solution comprises an electrolyte lithium salt, and the electrolyte lithium salt comprises a fluorine-containing electrolyte lithium salt. Optionally, the fluorine-containing electrolyte lithium salt is selected from one or more of lithium hexafluorophosphate, lithium tetrafluoroborate, lithium difluoro(oxalato)borate, lithium difluorophosphate, lithium difluorobis(oxalate)phosphate, lithium tetrafluoro(oxalato) phosphate, lithium bis(fluorosulfonyl)imide, lithium bis (trifluoromethanesulfonyl)imide, lithium trifluoromethanesulfonate, lithium bis(trifluoromethanesulfonyl) methide and lithium tris(trifluoromethanesulfonyl) methide. In the present application, the lithium supplementing layer is provided on a surface of the positive electrode active material layer opposite to the positive electrode current collector, and a metal oxide formed by the lithium-rich metal oxide therein after lithium deintercalation can preferentially react with HF in the fluorine-containing electrolyte solution, so that the loss of the positive electrode active material can be reduced, and the battery is enabled to obtain a long cycle life. In particular, a metal fluoride formed by the reaction can also improve the lithium ion migration performance of the lithium supplementing layer.

A third aspect of the present application provides a battery module comprising a secondary battery according to the present application.

A fourth aspect of the present application provides a battery pack comprising at least one of a secondary battery or a battery module according to the present application.

A fifth aspect of the present application provides a power consuming device comprising at least one of a secondary battery, a battery module or a battery pack according to the present application.

The battery module, the battery pack and the power consuming device of the present application comprise the secondary battery of the present application and thus have at least the same or similar technical effects as the secondary battery.

A sixth aspect of the present application provides a method for manufacturing a secondary battery, comprising a step of preparing a positive electrode plate by the following method: a positive electrode active material layer is formed on at least one surface of a positive electrode current collector; and a lithium supplementing layer is formed on a surface of the positive electrode active material layer opposite to the positive electrode current collector, wherein the lithium supplementing layer comprises a positive electrode lithium supplementing material, a conductive agent and a binder A, the positive electrode lithium supplementing material comprises a lithium-rich metal oxide, and the binder A is selected from polymers containing a first monomer unit and a second monomer unit,

I

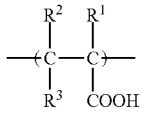

-continued

II

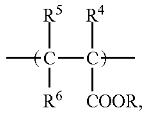

wherein the $R^1$, $R^2$, $R^3$, $R^4$, $R^5$ and $R^6$ are each independently selected from hydrogen or substituted or unsubstituted C1 to C8 alkyl, and the R is selected from substituted or unsubstituted C1 to C8 alkyl.

According to the manufacturing method of the present application, by providing the lithium supplementing layer on a surface of the positive electrode active material layer opposite to the positive electrode current collector and by using a polymer containing a first monomer unit and a second monomer unit as a binder in the lithium supplementing layer, it is helpful for the positive electrode lithium supplementing material in the positive electrode plate to achieve a high utilization rate of active lithium, so that the first charge/discharge capacity and energy density of the battery can be improved and the battery is enabled to obtain a long cycle life. Further, according to the manufacturing method of the present application, the positive electrode plate can have good electron conduction performance and lithium ion transport performance after lithium deintercalation of the lithium supplementing layer, and thus the cycle life of a secondary battery using the same can be further improved.

DETAILED DESCRIPTION OF EMBODIMENTS

Figure 1:
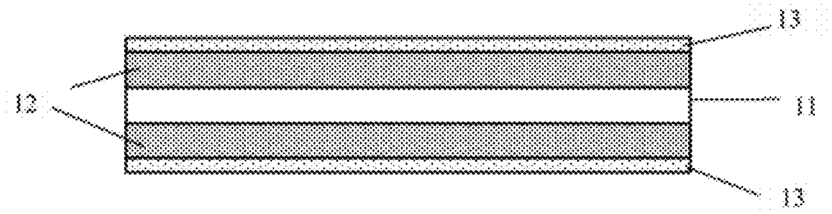
FIG. 1 is a structural schematic diagram of a positive electrode plate provided by an embodiment of the present application.

Hereinafter, embodiments of a positive electrode plate, a secondary battery and a preparation method thereof and a battery module, a battery pack and a power consuming device comprising the secondary battery of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60 to 120 and 80 to 110 are listed for a particular parameter, it should be understood that the ranges of 60 to 110 and 80 to 120 are also contemplated. In addition, if minimum range values 1 and 2 are listed, and if maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0 to 5" means that all real numbers between "0 to 5" have been listed in the text, and "0 to 5" is just an abbreviated representation of combinations of these numerical values. In addition, when a parameter is expressed as an integer of ≥2, it is equivalent to disclose that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

Unless otherwise specified, "above" and "below" mentioned in the present application are inclusive of the number itself, and "more" means two or more than two.

In order to meet the requirement of a high energy density of a secondary battery, a lithium supplementing layer comprising a positive electrode lithium supplementing material can be provided on the positive electrode plate to prepare a lithium-rich composite positive electrode. During the first charge process of the secondary battery, the positive electrode lithium supplementing material will release active lithium that can be used to compensate for the irreversible loss of active lithium caused by the formation of a SEI film on the negative electrode.

The positive electrode lithium supplementing material may comprise a lithium-rich metal oxide. However, the existing lithium-rich metal oxide is often added with an excessive lithium source during synthesis in order to increase the lithium content thereof. Residual lithium source on the surface of the lithium-rich metal oxide can react with $CO_2$ and $H_2O$ in the external environment to generate free lithium compounds such as LiGH and $Li_2CO_3$. The presence of the free lithium compounds not only reduces the energy density of the battery, but also leads to a relatively high pH value of the positive electrode lithium supplementing material (e.g., pH≥11). During preparation of a lithium supplementing layer slurry, the positive electrode lithium supplementing material with a high pH value can react with a positive electrode binder (e.g., polyvinylidene fluoride PVDF) that is currently commonly used, to cause gelation of the slurry. This will not only make the processing of the lithium supplementing layer difficult, but also affect the bonding performance between the lithium supplementing layer and the adjacent active material layer, thereby reducing the lithium supplementing effect.

Through further research, the inventors have found that the above-mentioned problems can be solved to improve the lithium supplementing effect by an optimized design of the lithium supplementing layer, including a matched design of the positive electrode lithium supplementing material and the binder.

Based on this, an embodiment of the present application provides a positive electrode plate. The positive electrode plate comprises a positive electrode current collector, a positive electrode active material layer provided on at least one surface of the positive electrode current collector, and a lithium supplementing layer provided on a surface of the positive electrode active material layer opposite to the positive electrode current collector, wherein the lithium supplementing layer comprises a positive electrode lithium supplementing material, a conductive agent and a binder A, the positive electrode lithium supplementing material comprises a lithium-rich metal oxide, and the binder A is selected from polymers containing a first monomer unit shown by a formula I and a second monomer unit shown by a formula II,

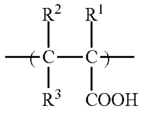
I

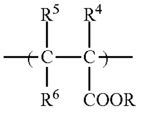
II $R^1$, $R^2$, $R^3$, $R^4$, $R^5$ and $R^6$ are each independently selected from hydrogen or substituted or unsubstituted C1 to C8 alkyl; and R is selected from substituted or unsubstituted C1 to C8 alkyl.

The term "C1 to C8 alkyl" represents alkyl containing 1 to 8 carbon atoms. Examples of the C1 to C8 alkyl may include methyl, ethyl, n-propyl, iso-propyl, n-butyl, iso-butyl, sec-butyl, tert-butyl, n-amyl, iso-amyl, n-hexyl, n-heptyl, n-octyl, etc. One or more hydrogen atoms in the "substituted C1 to C8 alkyl" may be substituted with another element or group. The other element may be, but is not limited to, F, C1, O and the like. The other group may be, but is not limited to, hydroxyl, amino, phenyl, methoxy and the like.

The positive electrode is an electrode with a higher potential in a battery. The positive electrode plate is an electrode plate arranged on the positive electrode. The positive electrode lithium supplementing material is usually arranged on the positive electrode, and can provide additional active lithium during the first or initial charge process of the battery. The active lithium provided by the positive electrode lithium supplementing material can be used to compensate for the irreversible loss of active lithium caused by the formation of a SEI film on the negative electrode, so that the storage of active lithium in the battery and the cycle life of the battery can be improved.

The positive electrode lithium supplementing material comprises a lithium-rich metal oxide, and the lithium supplementing layer uses a polymer (namely, binder A) containing a first monomer unit and a second monomer unit as a binder. The first monomer unit in the binder A has a carboxyl group which can undergo an acid-base neutralization reaction with free lithium compounds such as LiGH and $Li_2CO_3$ on the surface of the lithium-rich metal oxide, so as to reduce the pH value of the positive electrode lithium supplementing material comprising the lithium-rich metal oxide, so that the problem of slurry gelation can be effectively improved. In addition, the structural formula of the binder A also comprises a second monomer unit, which can effectively avoid excessive carboxyl group in the binder A from reacting with active lithium ions, so as to reduce the loss of active lithium and ensure that more active lithium is used for lithium supplementation. As can be seen, in the present application, since a polymer containing the first monomer unit and the second monomer unit is used as the binder in the lithium supplementing layer, the slurry stability of the positive electrode lithium supplementing material containing the lithium-rich metal oxide can be improved, and the fluidity of the slurry is good, so that the processability of the lithium supplementing layer on the surface of the positive electrode active material layer is effectively improved, and a tight binding between the lithium supplementing layer and the positive electrode active material layer is guaranteed; and also, it is helpful for the positive electrode lithium supplementing material to release more lithium ions in a charging process.

Therefore, the positive electrode lithium supplementing material in the positive electrode plate of the present application can achieve a high utilization rate of active lithium. The active lithium provided by the positive electrode lithium supplementing material can effectively compensate for the loss of active lithium caused by the formation of a SEI film, so that the first discharge capacity of the battery can be improved, and the battery can thus obtain a high energy density. A part of the active lithium from the positive electrode lithium supplementing material can also be intercalated into a negative electrode active material, and the negative electrode active material is made in a certain lithium-intercalated state, so that the volume change of the negative electrode active can be alleviated to a certain degree. Therefore, the risk of fracture or powder-dropping of the negative electrode active material of a negative electrode plate is reduced while good wettability of an electrolyte solution and a high liquid retention rate can be maintained. The part of active lithium stored in the negative electrode can also be used to compensate for the loss of active lithium in the cycle process of the battery in the middle-late period of the cycle. Therefore, the battery can also have a long cycle life.

In addition, the carboxyl lithium (—COOLi) formed by reaction between carboxyl group in the binder A and the free lithium compounds can reversibly undergo dissociation and association of lithium ions, and thus can serve as a lithium ion transport channel, so as to improve the lithium ion transport performance of the lithium supplementing layer. This not only facilitates improvement of the lithium supplementing efficiency, but also enables the lithium supplementing layer after lithium deintercalation to have good ion transport performance, thereby helping the battery to obtain improved first charge/discharge capacity and cycle life.

When the lithium supplementing layer is provided on a surface of the positive electrode active material layer opposite to the positive electrode current collector, it is beneficial for the positive electrode lithium supplementing material to release more lithium ions. Moreover, the lithium supplementing layer is close to the negative electrode, which is beneficial for the active lithium deintercalated from the positive electrode lithium supplementing material to migrate to the negative electrode for lithium supplementation. Therefore, a utilization rate of active lithium of the positive electrode lithium supplementing material is high, which enables the battery to have a high storage of active lithium, thereby improving the initial charge/discharge capacity, energy density and cycle life of the battery.

The positive electrode lithium supplementing material after lithium deintercalation often encounters volume shrinkage. Providing the lithium supplementing layer on a surface of the positive electrode active material layer opposite to the positive electrode current collector can avoid adversely affecting the positive electrode active material layer and the electron conduction performance between the positive electrode active material layer and the positive electrode current collector. In particular, the gaps formed by the volume shrinkage of the particles can also promote diffusion of the electrolyte solution toward the positive electrode active material layer inside the plate, thereby facilitating transport of lithium ions. Therefore, the cycle life of the battery can be further improved.

In some embodiments, the first monomer unit satisfies that: $R^1$, $R^2$ and $R^3$ are each independently selected from hydrogen or substituted or unsubstituted C1 to C8 alkyl. Optionally, $R^1$, $R^2$ and $R^3$ are each independently selected from hydrogen or substituted or unsubstituted C1 to C4 alkyl. Still optionally, $R^1$, $R^2$ and $R^3$ are each independently selected from hydrogen or methyl. As an example, $R^2$ and $R^3$ each represent hydrogen, and $R^1$ represents hydrogen or methyl.

Optionally, the first monomer unit includes one or more of the monomer units shown by a formula S1 and a formula S2.

S1

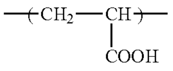

S2

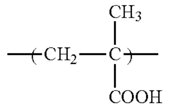

In some embodiments, the second monomer unit satisfies that: $R^4$, $R^5$ and $R^6$ are each independently selected from hydrogen or substituted or unsubstituted C1 to C8 alkyl. Optionally, $R^4$, $R^5$ and $R^6$ are each independently selected from hydrogen or substituted or unsubstituted C1 to C4 alkyl. Still optionally, $R^4$, $R^5$ and $R^6$ are each independently selected from hydrogen or methyl. As an example, $R^4$ represents hydrogen or methyl, and $R^5$ and $R^6$ each represent hydrogen.

In some embodiments, the second monomer unit satisfies that R is selected from substituted or unsubstituted C1 to C8 alkyl. Optionally, R is selected from substituted or unsubstituted C1 to C4 alkyl. As an example, R is selected from methyl, ethyl, n-propyl, iso-propyl, n-butyl, tert-butyl, sec-butyl or iso-butyl. Optionally, R is selected from methyl, ethyl, n-propyl or n-butyl.

Optionally, the second monomer unit includes one or more of the monomer units shown by formulas S3 to S8.

S3

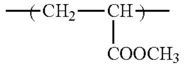

S4

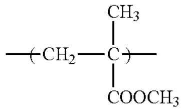

S5

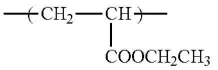

S6

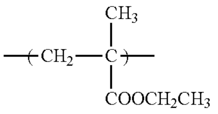

S7

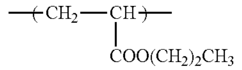

S8

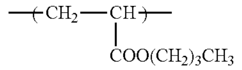

The binder A may be selected from polymers containing any one or more of the first monomer units and any one or more of the second monomer units. In some embodiments, the binder A is selected from one or more of a polymer containing monomer units S1 and S5, a polymer containing monomer units S1 and S8, a polymer containing monomer units S1, S5 and S8, a polymer containing monomer units S1, S3, S5 and S8, a polymer containing monomer units S2 and S8, a polymer containing monomer units S2 and S7, a polymer containing monomer units S2 and S5, and a polymer monomer units S2 and S6.

In some embodiments, the binder A is selected from one or more of a polymer of monomer units S1 and S5, a polymer of monomer units S1 and S8, a polymer of monomer units S1, S5 and S8, a polymer of monomer units S1, S3, S5 and S8, a polymer of monomer units S2 and S8, a polymer of monomer units S2 and S7, a polymer of monomer units S2 and S5, and a polymer of monomer units S2 and S6. Optionally, the binder A is selected from one or more of a polymer of monomer units S1 and S5, a polymer of monomer units S1 and S8, a polymer of monomer units S2 and S8, a polymer of monomer units S2 and S7, a polymer of monomer units S2 and S5, and a polymer of monomer units S2 and S6. Further optionally, the binder A is selected from one or more of a polymer of monomer units S1 and S5, a polymer of monomer units S1 and S8, a polymer of monomer units S2 and S7 and a polymer of monomer units S2 and S5. In some embodiments, the binder A comprises or is a polymer of monomer units S1 and S5.

In some embodiments, based on the total weight of the first monomer unit and second monomer unit, the content of the first monomer unit in the binder A is 30% to 70%, and optionally 40% to 60%. When the binder A contains an appropriate amount of the first monomer unit, the free lithium compounds on the surface of the lithium-rich metal oxide can be sufficiently consumed, and the problem of slurry gelation can be further alleviated. Moreover, the binder A can react with the free lithium compounds to form an appropriate amount of carboxyl lithium, so that the lithium ion transport performance of the lithium supplementing layer can be improved. Therefore, the first charge/discharge capacity and cycle life of the battery can be further improved.

In some embodiments, based on the total weight of the first monomer unit and second monomer unit, the content of the second monomer unit in the binder A is optionally 70% to 30%, and optionally 60% to 40%. When the binder A contains an appropriate amount of the second monomer unit, the loss of active lithium can be further reduced and the utilization rate of the active lithium in supplementing lithium is improved. In addition, when the content of the second monomer unit is appropriate, it is helpful for the binder A to obtain a suitable molecular chain segment length, so that the binder A can play a better role of crosslinking and bonding, so as to improve the bonding effect between the particles of the lithium supplementing layer and between the lithium supplementing layer and the positive electrode active material layer. And also, the compressive strength of the positive electrode plate can be improved.

In some embodiments, the weight-average molecular weight of the binder A is 30,000 to 600,000, and optionally 50,000 to 600,000, 50,000 to 500,000, 100,000 to 400,000, 100,000 to 300,000, 150,000 to 350,000, 180,000 to 300,000, or 150,000 to 250,000. When the molecular weight of the binder A is in an appropriate range, enough carboxyl group can be provided to alleviate the problem of slurry gelation, the loss of active lithium can be reduced to improve the capacity utilization rate of the positive electrode lithium supplementing material in supplementing lithium, and a better crosslinking and entanglement effect can be realized on the positive electrode lithium supplementing material, thereby improving the bonding effect of the binder A.

In some embodiments, the weight proportion of the binder A in the lithium supplementing layer is 2% to 7%, and optionally 3% to 6%, 3% to 4.5% or 3.5% to 5%. When the lithium supplementing layer contains an appropriate amount of the binder A, the problem of slurry gelation can be effectively alleviated and a strong bonding effect between the particles of the lithium supplementing layer and between the lithium supplementing layer and the positive electrode active material layer is formed. And also, the lithium supplementing layer may also have a high proportion of the positive electrode lithium supplementing material. Therefore, both the energy density and cycle life of the battery can be improved.

In some embodiments, the gram capacity of the positive electrode lithium supplementing material is ≥400 mAh/g, and optionally ≥450 mAh/g, ≥500 mAh/g, ≥600 mAh/g, ≥700 mAh/g, or ≥900 mAh/g. The gram capacity of the positive electrode lithium supplementing material is a ratio of the capacity that the positive electrode lithium supplementing material can release and the mass thereof. If the gram capacity of the positive electrode lithium supplementing material is higher, a lithium supplementing layer with a smaller thickness can be used to provide more active lithium for lithium supplementation, so that the storage of active lithium on the negative electrode can be improved and high ion transport performance of the positive electrode plate is guaranteed, thereby further improving the first charge/discharge capacity and cycle life of the battery.

In some embodiments, the lithium-rich metal oxide is selected from one or more of $Li_3M^1O_4$, $Li_5M^2O_4$ and $Li_6M^3O_4$. $M^1$ may include one or more of V, Nb, Cr and Mo. Optionally, $M^1$ includes one or more of V, Nb and Mo. As an example, $Li_3M^1O_4$ may include one or more of $Li_3VO_4$, $Li_3NbO_4$ and $Li_3MoO_4$. Optionally, $Li_3M^1O_4$ includes one or more of $Li_3VO_4$ and $Li_3NbO_4$. $M^2$ may include one or more of Fe, Cr, V, Mo and Al. Optionally, $M^2$ includes one or more of Fe, Cr and V. As an example, $Li_5M^2O_4$ may include one or more of $Li_5FeO_4$, $Li_5CrO_4$ and $Li_5VO_4$. Optionally, $Li_5M^2O_4$ includes $Li_5FeO_4$. $M^3$ may include one or more of Co, V, Cr and Mo. Optionally, $M^3$ includes one or more of Co, V and Cr. As an example, $Li_6M^3O_4$ may include one or more of $Li_6CoO_4$, $Li_6VO_4$ and $Li_6CrO_4$. Optionally, $Li_6M^3O_4$ includes $Li_6CoO_4$. The valence of each metal element except Li in the lithium-rich metal oxide is lower than its own highest oxidation valance.

The above-mentioned lithium-rich metal oxide may have high gram capacity. Optionally, the lithium-rich metal oxide is selected from one or more of $Li_3VO_4$, $Li_3NbO_4$, $Li_5FeO_4$ and $Li_6CoO_4$.

In some embodiments, the lithium-rich metal oxide may also be selected from other lithium-rich metal oxides that can be used as a positive electrode lithium supplementing material, for example, one or more of $Li_2M^4O_2$ and $Li_2M_5O_3$. $M^4$ may include one or more of Ni, Co, Fe, Mn, Zn, Mg, Ca and Cu. As an example, $Li_2M^4O_2$ may include one or more of $Li_2NiO_2$, $Li_2MnO_2$, $Li_2CuO_2$, $Li_2Ni_{0.6}Cu_{0.4}O_2$, $Li_2Co_{0.6}Mn_{0.4}O_2$ and the like. A may include one or more of Mn, Sn, Mo, Ru and Ir. As an example, $Li_2M^5O_3$ may include one or more of $Li_2MnO_3$ and $Li_2MoO_3$. The valence of each metal element except Li in the lithium-rich metal oxide is lower than its own highest oxidation valance.

In some embodiments, the lithium-rich metal oxide comprises monocrystal particles. The number proportion of the monocrystal particles in the lithium-rich metal oxide is optionally 60% to 100%, and still optionally 80% to 100%, 90% to 100% or 95% to 100%. When the lithium-rich metal oxide is dominated by monocrystal particles, the compressive property of the lithium supplementing layer and the positive electrode active material layer can be improved, so that the phenomenon of cracking of the particles can be reduced when the positive electrode lithium supplementing material and the positive electrode active material are under a pressure (e.g., rolling of the plate and cyclic expansion force of the battery), thereby improving the structural stability of the particles. Therefore, the battery can obtain a prolonged cycle life. In addition, the positive electrode active material layer can also obtain a high compacted density, which is beneficial to improve the energy density of the battery.

Optionally, the volume-average particle size $D_v50$ of the lithium-rich metal oxide is m to 25 μm, and optionally 6 μm to 20 μm, 8 μm to 16 μm, 10 μm to 15 μm or 11 am to 13 μm. When the lithium-rich metal oxide contains more monocrystal particles and also satisfies that $D_v50$ is in an appropriate range, the compressive property of the lithium supplementing layer and the positive electrode active material layer can be further improved, thereby further improving the cycle life and energy density of the battery.

In some embodiments, the pH of the positive electrode lithium supplementing material is ≤13, and optionally ≤12.5. The pH of the positive electrode lithium supplementing material is measured by the titration method. A reagent solution used in the titration method is, for example, a standard solution of hydrochloric acid. An exemplary measurement method is as follows: 30 g of a positive electrode lithium supplementing material is added into 100 mL of deionized water, and stirred for 30 min at a speed of 200 rpm, to obtain a test sample; and free lithium compounds in the test sample are titrated with a standard solution of hydrochloric acid, and with a composite pH electrode as an indicator electrode, the titration end point is determined by means of sudden leap resulting from potential changes, to measure the pH of the positive electrode lithium supplementing material.

When the pH of the positive electrode lithium supplementing material is in the above-mentioned range, it is beneficial to further reduce the risk of slurry gelation of the lithium supplementing layer. Optionally, the pH of the positive electrode lithium supplementing material is 11 to 13, and optionally 11 to 12.5 or 12 to 12.5. The positive electrode lithium supplementing material may have high gram capacity.

In some embodiments, the weight proportion of the positive electrode lithium supplementing material in the lithium supplementing layer is 90% to 97%, and optionally 92% to 96%, 92.5% to 95% or 93% to 95%. When the proportion of the positive electrode lithium supplementing material is appropriate, more active lithium can be provided to achieve a better lithium supplementing effect, thereby improving the first charge/discharge capacity and cycle life of the battery.

In some embodiments, the weight proportion of the conductive agent in the lithium supplementing layer is 1% to 3%, and optionally 1.5% to 2.5%. When the lithium supplementing layer contains an appropriate amount of the conductive agent, the electron conduction performance of the lithium supplementing layer can be improved, which is helpful for the positive electrode lithium supplementing material to release more lithium ions, so that the first charge/discharge capacity and cycle life of the battery can be improved.

The conductive agent of the lithium supplementing layer may be a conductive agent for a secondary battery that is known in the art. For example, the conductive agent of the lithium supplementing layer may be selected from one or more of superconductive carbon, carbon black (e.g., acetylene black, Ketjen black, Super P, etc.), carbon dots, carbon nanotubes, graphene and carbon nanofibers.

In some embodiments, based on the total thickness of the positive electrode active material layer and the lithium supplementing layer, the thickness proportion of the lithium supplementing layer is 3% to 22%, and optionally 5% to 20%, 8% to 15%, 10% to 14%, 11% to 13%, 8% to 20%, 10% to 18% or 12% to 16%. When the thickness proportion of the lithium supplementing layer is in an appropriate range, an appropriate proportion of the positive electrode lithium supplementing material can be guaranteed to achieve a good lithium supplementing effect, and an appropriate proportion of the positive electrode active material can also be guaranteed to provide a high reversible capacity, thereby enabling the battery to obtain a high energy density and a long cycle life. In addition, when the thickness proportion of the lithium supplementing layer is appropriate, it can also facilitate process control to reduce the preparation difficulty.

The positive electrode active material layer comprises a positive electrode active material. The positive electrode active material refers to a material involved in the intercalation and deintercalation of active ions in the positive electrode plate in a charge/discharge process of the battery. In the positive electrode plate of the present application, the positive electrode active material may be an active material for the positive electrode of a secondary battery that is well known in the art. As an example, the positive electrode active material may include one or more of a polyanion-type positive electrode material, a lithium transition metal oxide, and modified materials of the forgoing substances. Examples of the lithium transition metal oxide may include, but are not limited to, one or more of lithium cobalt oxide (e.g., $LiCoO_2$), lithium nickel oxide (e.g., $LiNiO_2$), lithium manganese oxide (e.g., $LiMnO_2$, $LiMn_2O_4$), lithium nickel cobalt oxide, lithium manganese cobalt oxide, lithium nickel manganese oxide, lithium nickel cobalt manganese oxide (e.g., $LiNi_{x1}Co_{y1}Mn_{z1}O_2$, where $0<x1<1$, $0<y1<1$, $0<z1<1$, $x1+y1+z1=1$, specific examples including $LiNi_{1/3}Co_{1/3}Mn_{1/3}O_2$, $LiNi_{0.5}Co_{0.2}Mn_{0.3}O_2$, $LiNi_{0.5}Co_{0.25}Mn_{0.25}O_2$, $LiNi_{0.6}Co_{0.2}Mn_{0.2}O_2$ and $LiNi_{0.8}Co_{0.1}Mn_{0.1}O_2$), lithium nickel cobalt aluminum oxide (e.g., $LiNi_{x2}Co_{y2}Al_{z2}O_2$, where $0<x2<1$, $0<y2<1$, $0<z2<1$, $x2+y2+z2=1$, specific examples including $LiNi_{0.85}Co_{0.15}Al_{0.05}O_2$) and modified materials of the forgoing substances. Examples of the polyanion-type positive electrode material may include, but are not limited to, lithium iron phosphate (e.g., $LiFePO_4$), lithium manganese phosphate (e.g., $LiMnPO_4$), lithium vanadium phosphate (e.g., $Li_3V_2(PO_4)$), lithium iron manganese phosphate (e.g., $LiFe_{x3}Mn_{1-y3}PO_4$, where $0<y3<1$) and modified materials of the forgoing substances. However, the present application is not limited to these materials, and other conventional materials that can be used as positive electrode active materials for batteries may also be used. The positive electrode active materials may be used alone or in combination of two or more.

In the present application, the modified material of the lithium transition metal oxide or polyanion-type positive electrode material may be a coating-modified material, a doping-modified material, or a doping-coating-modified material.

In some embodiments, the weight proportion of the positive electrode active material in the positive electrode active material layer is 95% to 98%.

In some embodiments, the positive electrode active material layer may also optionally comprise a binder. The binder may be a binder for a positive electrode active material layer that is known in the art. As an example, the binder may include one or more of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and a fluorinated acrylate resin.

In some embodiments, the weight proportion of the binder in the positive electrode active material layer is 1% to 3%, and optionally 1% to 2% or 1.5% to 2.5%.

Through further research, the inventors have found that, the performance of the positive electrode plate can be further improved by a matched design of the binder of the positive electrode active material layer and the binder of the lithium supplementing layer.

In some embodiments, the positive electrode active material layer comprises a binder B and a binder C, wherein the binder B comprises one or more of PVDF and PTFE, and the binder C is selected from polymers containing one or more from a group consisting of a third monomer unit shown by the formula III and a fourth monomer unit shown by the formula IV.

III

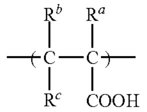

IV

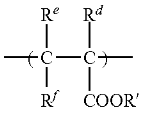

In the formula III, $R^a$, $R^b$ and $R^c$ are each independently selected from hydrogen or substituted or unsubstituted C1 to C8 alkyl. Optionally, $R^a$, $R^b$ and $R^c$ are each independently selected from hydrogen or substituted or unsubstituted C1 to C4 alkyl. Still optionally, $R^a$, $R^b$ and $R^c$ are each independently selected from hydrogen or methyl. In some embodiments, $R^a$ is selected from hydrogen or methyl, and $R^b$ and R' each represent hydrogen. As an example, the third monomer unit includes one or more of the monomer units shown by the formula S1 and the formula S2.

In the formula IV, $R^d$, $R^e$ and $R^f$ are each independently selected from hydrogen or substituted or unsubstituted C1 to C8 alkyl. Optionally, $R^d$, $R^e$ and $R^f$ are each independently selected from hydrogen or substituted or unsubstituted C1 to C4 alkyl. Still optionally, $R^d$, $R^e$ and $R^f$ are each independently selected from hydrogen or methyl. In some embodiments, $R^d$ is selected from hydrogen or methyl, and $R^e$ and $R^f$ each represent hydrogen.

In the formula IV, R' is selected from substituted or unsubstituted C1 to C8 alkyl. Optionally, R' is selected from substituted or unsubstituted C1 to C4 alkyl. As an example, R' is selected from methyl, ethyl, n-propyl, iso-propyl, n-butyl, tert-butyl, sec-butyl or iso-butyl. Optionally, R' is selected from methyl, ethyl, n-propyl or n-butyl.

As an example, the fourth monomer unit includes one or more of the monomer units shown by the formulas S3 to S8.

In some embodiments, the binder C may be selected from one or more of the following: a polymer C-1 containing any one or more of the third monomer units, a polymer C-2 containing any one or more of the fourth monomer units, and a polymer C-3 containing any one or more of the third monomer units and any one or more of the fourth monomer units. Examples of the polymer C-1 may be selected from a polymer containing a monomer unit S1, a polymer containing a monomer unit S2, and a polymer containing monomer units S1 and S2; and may be further selected from a polymer of a monomer unit S1, a polymer of a monomer unit S2 and a polymer of monomer units S1 and S2. Examples of the polymer C-2 may be selected from a polymer containing a monomer unit S3, a polymer containing a monomer unit S4, a polymer containing a monomer unit S5, a polymer containing monomer units S5 and S8, a polymer containing monomer units S3, S5 and S8, etc; and may be further selected from a polymer of a monomer unit S3, a polymer of a monomer unit S4, a polymer of a monomer unit S5, a polymer of monomer units S5 and S8, and a polymer of monomer units S3, S5 and S8. Examples of the polymer C-3 may be selected from a polymer containing monomer units S1 and S5, a polymer containing monomer units S1 and S8, a polymer containing monomer units S1, S5 and S8, a polymer containing monomer units S1, S3, S5 and S8, a polymer containing monomer units S2 and S8, a polymer containing monomer units S2 and S7, a polymer containing monomer units S2 and S5, a polymer containing monomer units S2 and S6, etc.; and may be further selected from a polymer of monomer units S1 and S5, a polymer of monomer units S1 and S8, a polymer of monomer units S1, S5 and S8, a polymer of monomer units S1, S3, S5 and S8, a polymer of monomer units S2 and S8, a polymer of monomer units S2 and S7, a polymer of monomer units S2 and S5, and a polymer of monomer units S2 and S6. Optionally, the binder C may be selected from one or more of a polymer C-1 and a polymer C-3.

In some embodiments, based on the total weight of the binder B and binder C, the content of the binder C is 5% to 20%. When the positive electrode active material layer contains the binder C, the bonding strength at an interface between the positive electrode active material layer and the lithium supplementing layer can be improved, so that a good conductive network is formed at the interface between the positive electrode active material layer and the lithium supplementing layer, thereby further improving the cycle performance of the battery. And also, the positive electrode active material layer also contains an appropriate amount of the binder B, which can reduce the loss of active lithium and ensure that more active lithium ions are used for the charge/discharge process of the battery. Therefore, the first charge/discharge capacity and cycle life of the battery can be further improved.

In some embodiments, the weight-average molecular weight of the binder C is 50 to 5,000, and optionally 100 to 4,000. When the weight-average molecular weight of the binder C is in an appropriate range, the bonding strength at an interface between the positive electrode active material layer and the lithium supplementing layer can be improved, free lithium compounds on the surface of the positive electrode active material can be consumed, and a small loss of the active lithium caused by reaction with the binder C is guaranteed, thereby further improving the first charge/discharge capacity and cycle life of the battery.

In some embodiments, the positive electrode active material in the positive electrode active material layer comprises a layered lithium transition metal oxide, wherein based on the total weight of the binder B and binder C, the content of the binder C is 5% to 20%, optionally 10% to 20%, and still optionally 12% to 18% or 13% to 17%. The layered lithium transition metal oxide may be a lithium transition metal oxide that is known in the art as a positive electrode active material and has a layered structure, for example, those described herein. In some embodiments, the layered lithium transition metal oxide includes one or more of a lithium-nickel-cobalt-manganese oxide, a lithium-nickel-cobalt-aluminum oxide and modified materials of the forgoing substances. The inventors have found that if the positive electrode active material comprises a layered lithium transition metal oxide and the positive electrode active material layer contains an appropriate proportion of the binder C, the first charge/discharge capacity and cycle life of the battery can be further improved.

In these embodiments, optionally, the weight-average molecular weight of the binder C is 500 to 4,000, and optionally 1,000 to 3,000 or 1,500 to 2,800. If the positive electrode active material comprises a layered lithium transition metal oxide and the weight-average molecular weight of the binder C is in the given range, the first charge/discharge capacity and cycle life of the battery can be further improved.

Optionally, the binder C is selected from polymers C-1 containing any one or more of the third monomer units. Further optionally, the binder C is selected from polymers containing a monomer unit S1. Further optionally, the binder C is selected from polymers of the monomer unit S1. If the positive electrode active material comprises a layered lithium transition metal oxide and the binder C is selected from the polymers C-1, the first charge/discharge capacity and cycle life of the battery can be further improved.

Optionally, the compacted density of the positive electrode active material layer is 3.5 $g/cm^3$ to 3.8 $g/cm^3$, and optionally 3.5 $g/cm^3$ to 3.65 $g/cm^3$, 3.55 $g/cm^3$ to 3.65 $g/cm^3$, 3.5 $g/cm^3$ to 3.6 $g/cm^3$ or 3.55 $g/cm^3$ to 3.6 $g/cm^3$; wherein the volume-average particle size $D_v50$ of the positive electrode active material is 2 μm to 10 μm, and optionally 4 μm to 8 μm. When the positive electrode active material layer obtains a high compacted density, the energy density of the battery can be improved. Optionally, the positive electrode active material is secondary particles formed by the aggregation of a plurality of primary particles.

In some embodiments, the positive electrode active material in the positive electrode active material layer comprises a polyanion-type positive electrode material, wherein based on the total weight of the binder B and binder C, the content of the binder C is 5% to 15%, and optionally 5% to 12%, 5% to 10%, 6% to 10% or 7% to 9%. The polyanion-type positive electrode material may be one that is known in the art as a positive electrode active material. for example, those described herein. In some embodiments, examples of the polyanion-type positive electrode material may include a lithium-containing phosphate with an olivine structure. The lithium-containing phosphate with an olivine structure is, for example, selected from one or more of lithium iron phosphate, lithium manganese phosphate, lithium iron manganese phosphate and modified materials of the forgoing substances. The inventors have found that, if the positive electrode active material comprises a polyanion-type positive electrode material and the positive electrode active material layer contains an appropriate proportion of the binder C, the first charge/discharge capacity and cycle life of the battery can be further improved.

In these embodiments, optionally, the weight-average molecular weight of the binder C is 100 to 3,000, and optionally 500 to 3,000, 500 to 1,500, 800 to 1,500 or 800 to 1,200. If the positive electrode active material comprises a polyanion-type positive electrode material and the weight-average molecular weight of the binder C is in the given range, the first charge/discharge capacity and cycle life of the battery can be further improved.

Optionally, the binder C is selected from one or more of polymers C-3 containing any one or more of the third monomer units and any one or more of the fourth monomer units. If the positive electrode active material comprises a polyanion-type positive electrode material and the binder C is selected from the polymers C-3, the first charge/discharge capacity and cycle life of the battery can be further improved.

Optionally, the binder C is selected from one or more of polymers containing at least one selected from monomer units S1 to S2 and at least one selected from S3 to S8. As an example, the binder C may be selected from one or more of a polymer containing monomer units S1 and S2, a polymer containing monomer units S1 and S3, a polymer containing monomer units S1 and S4, a polymer containing monomer units S1 and S5, a polymer containing monomer units S1 and S6, a polymer containing monomer units S1 and S7, a polymer containing monomer units S1 and S8, a polymer containing monomer units S1, S5 and S8, a polymer containing monomer units S1, S3, S5 and S8, a polymer containing monomer units S2 and S8, a polymer containing monomer units S2 and S7, a polymer containing monomer units S2 and S3, a polymer containing monomer units S2 and S4, a polymer containing monomer units S2 and S5 and a polymer containing monomer units S2 and S6. Further optionally, the binder C may be selected from one or more of a polymer of monomer units S1 and S2, a polymer of monomer units S1 and S3, a polymer of monomer units S1 and S4, a polymer of monomer units S1 and S5, a polymer of monomer units S1 and S6, a polymer of monomer units S1 and S7, a polymer of monomer units S1 and S8, a polymer of monomer units S1, S5 and S8, a polymer of monomer units S1, S3, S5 and S8, a polymer of monomer units S2 and S8, a polymer of monomer units S2 and S7, a polymer of monomer units S2 and S3, a polymer of monomer units S2 and S4, a polymer of monomer units S2 and S5 and a polymer of monomer units S2 and S6. Still optionally, the binder C may be selected from one or more of a polymer of monomer units S1 and S7, a polymer of monomer units S1 and S6 and a polymer of monomer units S2 and S7.

Optionally, the compacted density of the positive electrode active material layer is 2.4 g/cm$^3$ to 2.7 g/cm$^3$, and optionally 2.4 g/cm$^3$ to 2.55 g/cm$^3$, 2.45 g/cm$^3$ to 2.55 g/cm$^3$, 2.4 g/cm$^3$ to 2.5 g/cm$^3$ or 2.45 g/cm$^3$ to 2.5 g/cm$^3$; wherein the volume-average particle size $D_v50$ of the positive electrode active material is 0.2 μm to 1.5 μm, and optionally 0.5 μm to 1.2 μm or 0.6 μm to 1.0 μm. When the positive electrode active material layer obtains a high compacted density, the energy density of the battery can be improved. Optionally, the polyanion-type positive electrode material is primary particles in a non-aggregated state.

In some embodiments, a metal foil or a composite current collector can be used as the positive electrode current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, aluminum alloys, nickel, nickel alloys, titanium, titanium alloys, silver and silver alloys, etc.) on a polymer material substrate (such as polypropylene PP, polyethylene terephthalate PET, polybutylene terephthalate PBT, polystyrene PS, polyethylene PE, etc.).

In some embodiments, the positive electrode active material layer may also optionally comprise a conductive agent. An example, the conductive agent may include one or more of superconducting carbon, carbon black (e.g., acetylene black, Ketjen black, Super P, etc.), carbon dots, carbon nanotubes, graphene, and carbon nanofibers.

In some embodiments, the weight proportion of the conductive agent in the positive electrode active material layer is 1% to 2%.

In the positive electrode plate of the present application, the positive electrode active material layer can be provided on one side of the positive electrode current collector, or on both sides of the positive electrode current collector. A lithium supplementing layer is provided on the positive electrode active material layer on at least one side of the positive electrode current collector.

FIG. 1 is a positive electrode plate as an example. The positive electrode plate is composed of a positive electrode current collector 11, positive electrode active material layers 12 respectively provided on both sides of the positive electrode current collector 11, and lithium supplementing layers 13 provided on the positive electrode active material layers 12.

Figure 2:
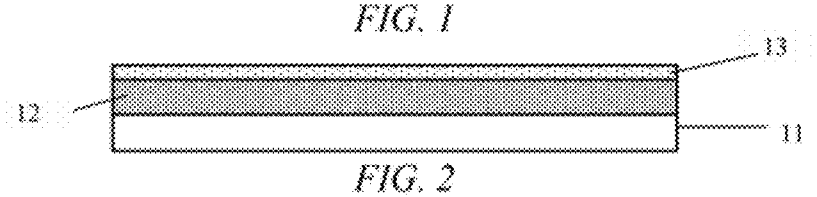
FIG. 2 is a structural schematic diagram of a positive electrode plate provided by another embodiment of the present application.

FIG. 2 is a positive electrode plate as another example. The positive electrode plate is composed of a positive electrode current collector 11, a positive electrode active material layer 12 provided on one side of the positive electrode current collector 11, and a lithium supplementing layer 13 provided on the positive electrode active material layer 12.

Notably, the film parameters (e.g., film thickness, compacted density, etc.) given in the present application each refer to a parameter range of a film on a single side of the positive electrode current collector. When a positive electrode active material layer and a lithium supplementing layer are provided on both sides of the positive electrode current collector respectively, the film parameters on either side satisfying the present application is deemed to fall within the protection scope of the present application. And, the ranges of the film thickness, compacted density and the like mentioned in the present application each refer to the film parameters obtained after compacted by cold pressing and used for battery assembly.

In the present application, the thickness of the lithium supplementing layer has a meaning well known in the art, and can be measured with a method and an instrument known in the art. For example, the thickness can be measured with a scanning electron microscope (SEM). An exemplary measurement method is as follows: A cross section of the positive electrode plate in the thickness direction is made; and the thickness of the lithium supplementing layer is measured with a scanning electron microscope (e.g., ZEISS Sigma 300). The cross section of the positive electrode plate can be obtained using an ion polisher (e.g., an argon ion cross section polisher, such as IB-19500CP). With the scanning electron microscope, an obvious interface between the lithium supplementing layer and the positive electrode active material layer can be observed in the cross section, thereby facilitating the thickness measurement.

In the present application, the volume-average particle size $D_v50$ of the positive electrode active material has a meaning well known in the art, and can be measured with a method and an instrument known in the art. For example, it can be measured with a laser particle size analyzer (e.g., Mastersizer 2000E), with reference to GB/T 19077-2016 Particle Size Distribution—Laser Diffraction Method. Herein, $D_v50$ represents a particle size corresponding to a cumulative volume distribution percentage of the material reaching 50%.

In the present application, the number proportion of monocrystal particles in the lithium-rich metal oxide has a meaning well known in the art, and can be measured with a method and an instrument known in the art. For example, it can be measured with a scanning electron microscope (SEM). An exemplary measurement method is as follows: The lithium-rich metal oxide is spread and adhered to a conductive adhesive, to made a test sample with a length of 6 cm and a width of 1.1 cm; and the particle morphology is measured with a scanning electron microscope (e.g., ZEISS Sigma 300). The measurement can be carried out by referring to JY/TO10-1996. In order to ensure the accuracy of the measurement result, a plurality of (e.g., 5) different regions can be randomly selected in the test sample for scanning measurement, and under a certain magnification (e.g., 1,000), the number percentage of monocrystal particles based on the total number of particles in each region is calculated, which is the number proportion of the monocrystal particles in this region. The average of the measurement results in the plurality of measurement regions is taken as a measurement result. In order to ensure the accuracy of the test results, the above measurement can be repeated using a plurality of (for example, 10) test samples, and an average of these test samples is taken as the final measurement result.

In the present application, the compacted density of the positive electrode active material layer has a meaning well known in the art, and can be measured with a method and an instrument known in the art. The compacted density of the positive electrode active material layer=the weight of the positive electrode active material layer/(the thickness of the positive electrode active material layer x the area of the positive electrode active material layer).

Next, the secondary battery, battery module, battery pack, and power consuming device of the present application will be described below by appropriately referring to the accompanying drawings.

In one embodiment of the present application, a secondary battery is provided.

Typically, the secondary battery comprises a positive electrode plate, a negative electrode plate and an electrolyte. During the charge/discharge process of the battery, active ions are intercalated and de-intercalated back and forth between the positive electrode plate and the negative electrode plate. The electrolyte is located between the positive electrode plate and the negative electrode plate and functions for ionic conduction.

[Positive Electrode Plate]

In the secondary battery of the present application, the positive electrode plate can be one or more of the positive electrode plates of the present application. Therefore, the secondary battery can obtain a high first charge/discharge capacity and energy density, and a long cycle life.

[Negative Electrode Plate]

In the secondary battery of the present application, the negative electrode plate may comprise a negative electrode current collector and a negative electrode active material layer provided on at least one surface of the negative electrode current collector, the negative electrode active material layer comprising a negative electrode active material. As an example, the negative electrode current collector has two opposite surfaces in its own thickness direction, and the negative electrode active material layer is provided on either or both of the two opposite surfaces of the negative electrode current collector.

In some embodiments, a metal foil or a composite current collector can be used as the negative electrode current collector. For example, as a metal foil, a copper foil can be used. The composite current collector may comprise a polymer material substrate and a metal layer formed on at least one surface of the polymer material substrate. The composite current collector can be formed by forming a metal material (copper, copper alloys, nickel, nickel alloys, titanium, titanium alloys, silver and silver alloys, etc.) on a polymer material substrate (such as polypropylene PP, polyethylene terephthalate PET, polybutylene terephthalate PBT, polystyrene PS, polyethylene PE, etc.).

In some embodiments, the negative electrode active material can be an active material for the negative electrode of a secondary battery that is well known in the art. As an example, the negative electrode active material may include one or more of artificial graphite, natural graphite, soft carbon, hard carbon, a silicon-based material, a tin-based material and lithium titanate, etc. The silicon-based material can be selected from one or more of elemental silicon, a silicon oxide compound, a silicon carbon composite, a silicon nitrogen composite and a silicon alloy. The tin-based material may be selected from one or more of elemental tin, a tin oxide compound and a tin alloy. However, the present application is not limited to these materials, and other conventional materials that can be used as negative electrode active materials for secondary batteries can also be used. The negative electrode active materials may be used alone or in combination of two or more.

In some embodiments, a negative electrode film may also optionally comprise a binder. The binder can be selected from one or more of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film may also optionally comprise a conductive agent. The conductive agent can be selected from one or more of superconducting carbon, carbon black (e.g., acetylene black, Ketjen black, Super P, etc.), carbon dots, carbon nanotubes, graphene, and carbon nanofibers.

In some embodiments, the negative electrode film may also optionally comprise other auxiliary agents, such as a thickening agent (e.g., sodium carboxymethyl cellulose CMC-Na) and the like.

[Electrolyte]

The type of the electrolyte in the present application is not specifically limited, and can be selected according to actual requirements. For example, the electrolyte may be liquid, gel or all solid.

In some embodiments, an electrolyte solution can be used as the electrolyte. The electrolyte solution comprises an electrolyte lithium salt and a solvent.

In some embodiments, the electrolyte lithium salt can be selected from the electrolyte lithium salts useful for the electrolyte solution of a secondary battery that are well known in the art, for example, one or more of lithium hexafluorophosphate, lithium tetrafluoroborate, lithium perchlorate, lithium hexafluorarsenate, lithium bis(fluorosulfonyl)imide, lithium bis(trifluoromethanesulfonyl)imide, lithium trifluoromethanesulfonate, lithium bis(trifluoromethanesulfonyl) methide, lithium tris(trifluoromethanesulfonyl) methide, lithium difluorophosphate, lithium difluoro(oxalato)borate, lithium bis(oxalate)borate, lithium difluorobis(oxalate)phosphate and lithium tetrafluoro(oxalato)phosphate.

In some embodiments, the electrolyte lithium salt may comprise a fluorine-containing electrolyte lithium salt. Optionally, the fluorine-containing electrolyte lithium salt can be selected from one or more of lithium hexafluorophosphate, lithium tetrafluoroborate, lithium difluoro(oxalato)borate, lithium difluorophosphate, lithium difluorobis(oxalate)phosphate, lithium tetrafluoro(oxalato)phosphate, lithium bis(fluorosulfonyl)imide, lithium bis(trifluoromethanesulfonyl)imide, lithium trifluoromethanesulfonate, lithium bis(trifluoromethanesulfonyl) methide and lithium tris(trifluoromethanesulfonyl) methide. An electrolyte solution using the fluorine-containing electrolyte lithium salt often contains a trace amount of HF. In the present application, the lithium supplementing layer is provided on a surface of the positive electrode active material layer opposite to the positive electrode current collector, and a metal oxide formed by the lithium-rich metal oxide therein after lithium deintercalation can preferentially react with HF in the electrolyte solution, thereby protecting the internal positive electrode active material layer and reducing the loss of the positive electrode active material. Therefore, the battery can obtain a long cycle life. In particular, a metal fluoride formed by the reaction can also improve the lithium ion migration performance of the lithium supplementing layer.

In some embodiments, the solvent can be selected from one or more of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may also optionally comprise an additive. For example, the additive can include a negative electrode film-forming additive, a positive electrode film-forming additive, and also an additive that can improve certain performances of the battery, such as an additive that improve the overcharge performance of the battery, or an additive that improve the high temperature performance or low-temperature performance of the battery.

[Separator]

In some embodiments, the secondary battery further comprises a separator. The separator is provided between the positive electrode plate and the negative electrode plate, and mainly prevents the positive and negative electrodes from short-circuiting and enables ions to pass through. The type of the separator is not particularly limited in the present application, and any well known porous-structure separator with good chemical stability and mechanical stability can be selected. As an example, the material of the separator can be selected from one of a glass fiber film, a non-woven fabric, a polyethylene film, a polypropylene film and a polyvinylidene fluoride film, or a composite film of two or more of the forgoing films.

In some embodiments, an electrode assembly can be formed by a positive electrode plate, a negative electrode plate and a separator by a winding process or a lamination process.

In some embodiments, the secondary battery can comprises an outer package. The outer package can be used to encapsulate the above-mentioned electrode assembly and electrolyte. The outer package of the secondary battery may be a hard case, for example, a hard plastic case, an aluminum case, a steel case, etc. The outer package of the secondary battery may also be a soft bag, such as a pouch-type soft bag. The material of the soft bag may be plastics, and the examples of plastics may include polypropylene, polybutylene terephthalate, and polybutylene succinate, etc.

Figure 3:
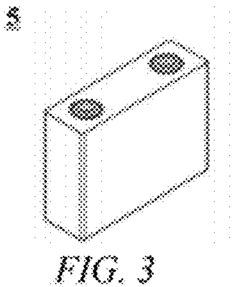
FIG. 3 is a schematic diagram of an embodiment of a secondary battery.

The shape of the secondary battery is not particularly limited in the present application, and may be cylindrical, square or of any other shape. For example, FIG. 3 shows a secondary battery 5 with a square structure as an example.

Figure 4:
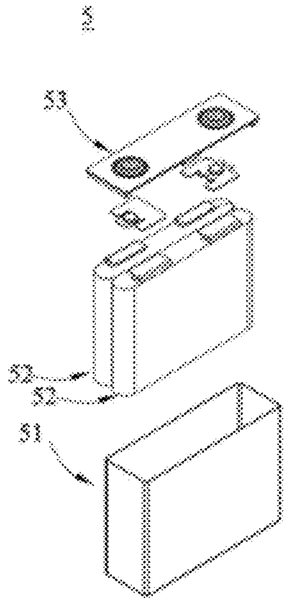
FIG. 4 is an exploded view of FIG. 3.

In some embodiments, referring to FIG. 4, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can form an electrode assembly 52 by a winding process or a lamination process. The electrode assembly 52 is encapsulated in the accommodating cavity. An electrolyte solution is infiltrated into the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

Figure 5:
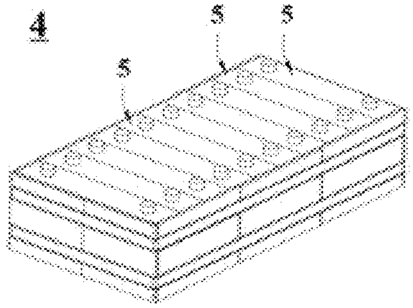
FIG. 5 is a schematic diagram of an embodiment of a battery module.

FIG. 5 shows a battery module 4 as an example. Referring to FIG. 5, in the battery module 4, a plurality of secondary batteries 5 can be provided sequentially in the length direction of the battery module 4. Apparently, the secondary batteries can also be arranged in any other manner. Furthermore, the plurality of secondary batteries 5 can be fixed by fasteners.

Optionally, the battery module 4 may also comprise a housing with an accommodating space, and a plurality of secondary batteries 5 are accommodated in the accommodating space.

In some embodiments, the secondary battery or battery module can also be assembled into a battery pack, and the number of the secondary batteries or battery modules contained in the battery pack may be one or more, and the specific number can be selected by those skilled in the art according to the application and capacity of the battery pack.

Figure 6:
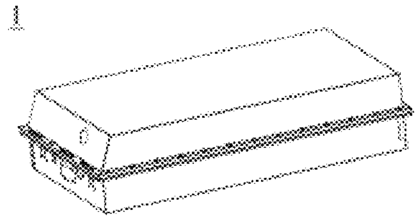
FIG. 6 is a schematic diagram of an embodiment of a battery pack.
Figure 7:
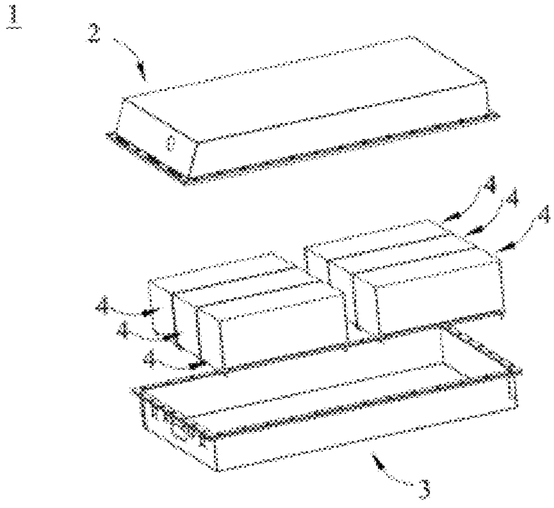
FIG. 7 is an exploded view of FIG. 6.

FIG. 6 and FIG. 7 show a battery pack 1 as an example. Referring to FIG. 6 and FIG. 7, the battery pack 1 may comprise a battery case and a plurality of battery modules 4 provided in the battery case. The battery case comprises an upper case body 2 and a lower case body 3, wherein the upper case body 2 can cover the lower case body 3 to form a closed space for accommodating the battery modules 4. A plurality of battery modules 4 can be arranged in the battery case in any manner.

In addition, the present application also provides a power consuming device comprising at least one of the secondary battery, battery module, or battery pack of the present application. The secondary battery, battery module or battery pack may be used as a power supply of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

As for the power consuming device, the secondary battery, battery module or battery pack can be selected according to the usage requirements thereof.

Figure 8:
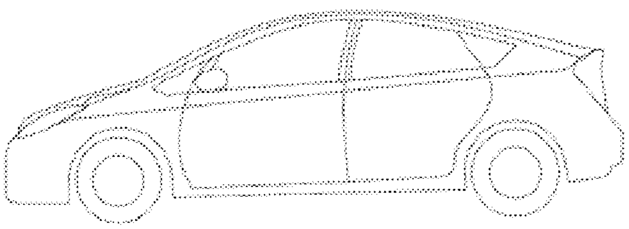
FIG. 8 is a schematic diagram of an embodiment of an device with a secondary battery as a power source.

FIG. 8 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module can be used.

As another example, the device may be a mobile phone, a tablet, a laptop computer, etc. The device is generally required to be thin and light, and may use a secondary battery as a power source.

The present application also provides a method for preparing a secondary battery. The preparation method comprises preparing a positive electrode plate of the secondary battery by the following steps: a positive electrode active material layer is formed on at least one surface of a positive electrode current collector; and a lithium supplementing layer is formed on a surface of the positive electrode active material layer opposite to the positive electrode current collector, wherein the lithium supplementing layer comprises a positive electrode lithium supplementing material, a conductive agent and a binder A, the positive electrode lithium supplementing material comprises a lithium-rich metal oxide, and the binder A is selected from polymers containing a first monomer unit and a second monomer unit,

I

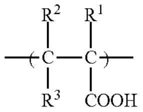

II

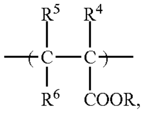

wherein the $R^1$, $R^2$, $R^3$, $R^4$, $R^5$ and $R^6$ are each independently selected from hydrogen or substituted or unsubstituted C1 to C8 alkyl, and the R is selected from substituted or unsubstituted C1 to C8 alkyl.

The positive electrode active material layer can be prepared by the following method: a positive electrode active material, an optional conductive agent, an optional binder and any other optional components are dispersed in a solvent (e.g., N-methylpyrrolidone NMP) to form a positive electrode slurry; the positive electrode slurry is coated onto a positive electrode current collector to form a positive electrode coating; and the positive electrode coating is subjected to drying and cold pressing to form a positive electrode active material layer.

The lithium supplementing layer can be prepared by the following method: a positive electrode lithium supplementing material, a conductive agent, a binder A and any other optional components are dispersed in a solvent (e.g., NMP) to form a lithium supplementing layer slurry; the lithium supplementing layer slurry is coated onto the positive electrode active material layer or the positive electrode coating to form a lithium supplementing coating; and the lithium supplementing coating is subjected to drying and cold pressing to form a lithium supplementing layer.

In some embodiments, a positive electrode coating can be formed on a surface of the positive electrode current collector at first; the positive electrode coating is subjected to drying and cold pressing to form a positive electrode active material layer; then a lithium supplementing coating is coated onto the positive electrode active material layer; and the lithium supplementing coating is subjected to drying and cold pressing to form a lithium supplementing layer.

In some embodiments, a positive electrode coating can be formed on a surface of the positive electrode current collector at first; the positive electrode coating is dried and then coated with a lithium supplementing coating; and after the lithium supplementing coating is dried, the positive electrode coating and the lithium supplementing coating are cold-pressed to form a positive electrode active material layer and a lithium supplementing layer.

In some embodiments, a positive electrode coating can be formed on a surface of the positive electrode current collector, and a lithium supplementing coating is formed on the positive electrode coating; and then drying and cold pressing are performed to form a positive electrode active material layer and a lithium supplementing layer. In these embodiments, the positive electrode slurry and the lithium supplementing layer slurry may be applied at the same time at one time, or may be applied at two times. Optionally, the positive electrode slurry and the lithium supplementing layer slurry are applied at the same time at one time. Applying at the same time at one time can result in better bonding between the positive electrode active material layer and the lithium supplementing layer.

Except the preparation method of the positive electrode plate of the present application, other structures and preparation methods of the secondary battery of the present application are well-known. For example, the negative electrode plate of the present application can be prepared by the following method: a negative electrode active material, and an optional conductive agent, an optional binder and any other optional components are dispersed in a solvent (e.g., deionized water) to form a negative electrode slurry; and the negative electrode slurry is coated onto a negative electrode current collector, and is then subjected to procedures such as drying and cold pressing, so as to obtain the negative electrode plate.

In some embodiments, the negative electrode plate, the positive electrode plate, the separator and the electrolyte solution can be assembled to form a secondary battery. As an example, the positive electrode plate, the separator and the negative electrode plate can form an electrode assembly by a winding process or a lamination process; and the electrode assembly is placed in an outer package, and an electrolyte solution is injected, followed by procedures such as vacuum packaging, standing, forming and shaping, to obtain a secondary battery.

The binder A and binder C of the present application can be a random copolymer respectively. The term "random" indicates that in the present application, the co-monomers of the random copolymer are randomly distributed in the copolymer. The binder A and binder C are commercially available, or can also be prepared by conventional polymerization methods in the art. The binder A and binder C can be prepared by similar methods. Taking an exemplary preparation method of the binder A as an example, a monomer mixture containing a first monomer and a second monomer can be subjected to a polymerization reaction in the presence of an initiator, so as to obtain a binder A.

First monomer:

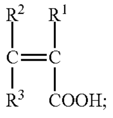

second monomer:

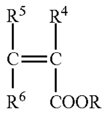

$R^1$, $R^2$, $R^3$, $R^4$, $R^5$, $R^6$ and R are as defined herein respectively.

As a specific example, the monomer units shown by S1 to S8 can be respectively derived from the monomers shown by the following m1 to m8.

m1

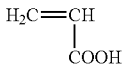

m2

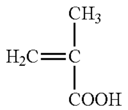

m3

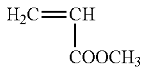

m4

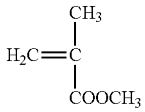

m5

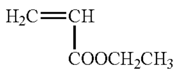

m6

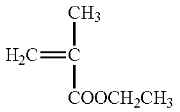

m7

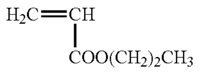

m8

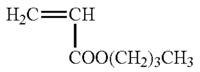

The type of the initiator is not particularly limited, and can be a conventional choice in the art. For example, the initiator can be selected from one or more of azodiisobutyronitrile, azodiisobutylamidine hydrochloride, azodiisobutylimidazoline hydrochloride, azodicyanovaleric acid, azodiisopropylimidazoline, etc. The conditions of the polymerization reaction and the amount of the initiator are not particularly limited, and can be selected according to the specific types of the monomers and the initiator. For example, the monomer mixture comprises a first monomer m1 and a second monomer m5, and the initiator is azodiisobutyronitrile, and the amount of the initiator is 0.05 to 0.15 weight parts, based on 100 weight parts of the monomer mixture. The polymerization temperature is 25° C. to 45° C., the polymerization is performed under normal pressure (atmospheric pressure), and the polymerization time is 2 to 8 h.

In the binder A of the present application, the first monomer unit is derived from a first monomer; and the second monomer unit is derived from a second monomer. The content proportions of the first monomer unit and the second monomer unit can be converted according to the content proportions of the first monomer and the second monomer, that is, the content proportions of the first monomer unit and the second monomer unit can be deemed to be approximately equal to the dosing proportions of the first monomer and the second monomer.

Similarly, in the binder C of the present application, the third monomer unit is derived from a third monomer; and the fourth monomer unit is derived from a fourth monomer.

Third monomer:

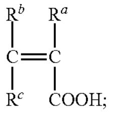

fourth monomer:

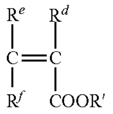

$R^a$, $R^b$, $R^c$, $R^d$, $R^e$, $R^f$ and R' are as defined herein respectively.

Optional technical features of the secondary battery of the present application also apply to the preparation method of the present application, and respective technical effects are obtained.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

The binder A used in each of the following examples is selected from A1 to A16, as listed in Table 1. In Table 1, the content of the first monomer unit means: the content of the first monomer unit based on the total weight of the first monomer unit and second monomer unit.

TABLE 1

| | Type | Weight-average molecular weight | Content of first monomer unit |
|---|---|---|---|
| Binder A1 | Polymer of monomer units S1 and S5 | 200,000 | 30% |
| Binder A2 | Polymer of monomer units S1 and S5 | 200,000 | 40% |
| Binder A3 | Polymer of monomer units S1 and S5 | 200,000 | 50% |
| Binder A4 | Polymer of monomer units S1 and S5 | 200,000 | 60% |
| Binder A5 | Polymer of monomer units S1 and S5 | 200,000 | 70% |
| Binder A6 | Polymer of monomer units S1 and S5 | 50,000 | 50% |
| Binder A7 | Polymer of monomer units S1 and S5 | 100,000 | 50% |
| Binder A8 | Polymer of monomer units S1 and S5 | 300,000 | 50% |
| Binder A9 | Polymer of monomer units Sl and S5 | 500,000 | 50% |

TABLE 1-continued

| | Type | Weight-average molecular weight | Content of first monomer unit |
|---|---|---|---|
| Binder A10 | Polymer of monomer units S1 and S5 | 180,000 | 50% |
| Binder A11 | Polymer of monomer units S1 and S5 | 220,000 | 50% |
| Binder A12 | Polymer of monomer units S1 and S5 | 30,000 | 40% |
| Binder A13 | Polymer of monomer units S1 and S5 | 600,000 | 30% |
| Binder A14 | Polymer of monomer units S2 and S5 | 200,000 | 50% |
| Binder A15 | Polymer of monomer units S1 and S8 | 200,000 | 50% |
| Binder A16 | Polymer of monomer units S2 and S7 | 200,000 | 50% |

The binder C used in each of the following examples is selected from C1 to C11, as listed in Table 2. In Table 2, the content of the third monomer unit means: the content of the third monomer unit based on the total weight of the third monomer unit and fourth monomer unit.

TABLE 2

| | Type | Weight-average molecular weight | Content of third monomer unit |
|---|---|---|---|
| Binder C1 | Polymer of monomer units S2 and S7 | 100 | 30% |
| Binder C2 | Polymer of monomer units S2 and S7 | 500 | 30% |
| Binder C3 | Polymer of monomer units S2 and S7 | 1,000 | 30% |
| Binder C4 | Polymer of monomer units S2 and S7 | 1,500 | 30% |
| Binder C5 | Polymer of monomer units S2 and S7 | 2,500 | 30% |
| Binder C6 | Polymer of monomer units S2 and S7 | 3,000 | 30% |
| Binder C7 | Polymer of monomer unit S1 | 500 | / |
| Binder C8 | Polymer of monomer unit S1 | 1,000 | / |
| Binder C9 | Polymer of monomer unit S1 | 2,500 | / |
| Binder C10 | Polymer of monomer unit S1 | 3,000 | / |
| Binder C11 | Polymer of monomer unit S1 | 4,000 | / |

The binder used in the lithium supplementing layer in each of the following comparative examples is selected from:

binder D1: polyvinylidene fluoride PVDF; where the weight-average molecular weight is 20,000;

binder D2: polyacrylic acid PAA; where the weight-average molecular weight is 20,000;

binder D3: a mixture of PAA and polyethylene acrylate; where the weight-average molecular weight of both PAA and polyethylene acrylate is 20,000; and based on the total weight of PAA and polyethylene acrylate, the content of PAA is 50%;

binder D4: PVDF; where the weight-average molecular weight is 200,000;

binder D5: PAA; where the weight-average molecular weight is 200,000;

and binder D6: a mixture of PAA and polyethylene acrylate; where the weight-average molecular weight of both PAA and polyethylene acrylate is 200,000; and based on the total weight of PAA and polyethylene acrylate, the content of PAA is 50%.

The lithium-rich metal oxide used in each of the following examples and comparative examples is monocrystal particles.

Example 1

Preparation of Positive Electrode Plate

A positive electrode active material $LiFePO_4$ (LFP for short), a conductive agent Super P and a binder PVDF (the weight-average molecular weight was about 1,000,000) were dispersed in a solvent NMP in a weight ratio of 97:2:1, and stirred and mixed uniformly, to obtain a positive electrode slurry. The $D_v50$ of the positive electrode active material was 0.8 μm.

A positive electrode lithium supplementing material $Li_5FeO_4$ (LFO for short), a conductive agent Super P and a binder A3 were dispersed in a solvent NMP in a weight ratio of 94:2:4, and stirred and mixed uniformly, to obtain a lithium supplementing layer slurry. The gram capacity of the positive electrode lithium supplementing material LFO was 690 mAh/g. The $D_v50$ of the positive electrode lithium supplementing material was 12 μm.

The positive electrode slurry was coated onto two opposite surfaces of an aluminum foil as a positive electrode current collector, to form a positive electrode coating; synchronously, the lithium supplementing layer slurry was coated on a surface of the positive electrode coating opposite to the positive electrode current collector; and drying and cold pressing were performed to obtain a positive electrode plate. The positive electrode plate comprised a positive electrode active material layer and a lithium supplementing layer provided on a surface of the positive electrode active material layer opposite to the positive electrode current collector. The compacted density of the positive electrode active material layer was 2.5 g/cm$^3$. The thickness of the positive electrode active material layer was 82.8 m. The thickness of the lithium supplementing layer was 4.35 μm.

Preparation of Negative Electrode Plate

Artificial graphite as a negative electrode active material, a conductive agent Super P, a binder SBR and a thickening agent CMC-Na were dispersed in deionized water as a solvent in a weight ratio of 96:1.5:1.5:1.0, and stirred and mixed uniformly, to obtain a negative electrode slurry. The negative electrode slurry was coated on two opposite surfaces of a copper foil as a negative electrode current collector, followed by drying and cold pressing, to obtain a negative electrode plate. The negative electrode active material layer had a compacted density of 1.65 g/cm$^3$ and a thickness of 200 μm.

Preparation of Electrolyte Solution

Ethylene carbonate (EC) and ethyl methyl carbonate (EMC) were mixed uniformly in a weight ratio of 30:70, to obtain an organic solvent; and then a lithium salt $LiPF_6$ was dissolved in the above organic solvent and mixed uniformly to obtain an electrolyte solution, where the concentration of $LiPF_6$ was 1 μmol/L.

Preparation of Secondary Battery

The positive electrode plate, a porous polyethylene (PE) separator and the negative electrode plate were laminated in sequence and then wound to obtain an electrode assembly; and the electrode assembly was put into an outer package, and the electrolyte solution was injected, followed by encapsulation, to obtain a secondary battery.

Examples 2 to 16 and Comparative examples 1 to 3: The preparation of a secondary battery was similar to that in Example 1, except that relevant preparation parameters in the preparation of a positive electrode plate were adjusted, see Table 3 for details.

Example 17 and Comparative examples 4 to 6: The preparation of a secondary battery was similar to that in Example 1, except that the positive electrode active material was $LiNi_{0.8}Co_{0.1}Mn_{0.1}O_2$(NCM811); the $D_v50$ of the positive electrode active material was 6 μm; the weight-average molecular weight of the binder PVDF was 1,100,000; the compacted density of the positive electrode active material layer was 3.6 g/cm$^3$; the thickness of the lithium supplementing layer was 14.61 μm; the negative electrode active material layer had a compacted density of 2.35 g/cm$^3$ and a thickness of 250 μm; other specific differences were shown in Table 3.

Examples 18 to 20: The preparation of a secondary battery was similar to that in Example 3, except that relevant preparation parameters in the preparation of a positive electrode plate were adjusted, see Table 4 for details. Herein, the gram capacity of a positive electrode lithium supplementing material $Li_3VO_4$ was 590 mAh/g; the gram capacity of a positive electrode lithium supplementing material $Li_3NbO_4$ was 450 mAh/g; and the gram capacity of a positive electrode lithium supplementing material $Li_6CoO_4$ was 970 mAh/g.

Examples 21 to 27: The preparation of a secondary battery was similar to that in Example 3, except that relevant preparation parameters in the preparation of a positive electrode plate were adjusted, see Table 5 for details.

Examples 28 to 36: The preparation of a secondary battery was similar to that in Example 3, except that a binder in the positive electrode slurry was a combination of PVDF and a binder C; and other specific differences were shown in Table 6.

Examples 37 to 45: The preparation of a secondary battery was similar to that in Example 17, except that a binder in the positive electrode slurry was a combination of PVDF and a binder C; and other specific differences were shown in Table 6.

In the table, the thickness proportion of the lithium supplementing layer is one based on the total thickness of the positive electrode active material layer and the lithium supplementing layer. The content of the binder C is one based on the total weight of the binder B and the binder C.

Test Section (1) Test of First Discharge Capacity and Cycle Life of Secondary Battery At 25° C., the secondary battery was charged with a constant current at 1 C rate to an upper cut-off voltage, and then charged with a constant voltage to a current of 0.05 C, and the charge capacity at this moment was recorded, namely, the first-round charge capacity; and the secondary battery was discharged with a constant current at 1 C to a lower cut-off voltage, and then left to stand for 5 min, completing a cyclic charge/discharge process, and the discharge capacity at this moment was recorded, namely, the first-round discharge capacity. The battery was subjected to the above-mentioned charge/discharge testing, and the discharge capacity of each round was recorded until the capacity retention rate of the battery was attenuated to 80%, and the number of cycle rounds at this moment was the cycle life.

First discharge gram capacity (mAh/g)=First-round discharge capacity/Mass of the positive electrode active material contained in the battery In the test, when the positive electrode active material was LFP, the charge/discharge voltage range of the secondary battery was 2.5 V to 3.65 V; and when the positive electrode active material was NCM811, the charge/discharge voltage range of the secondary battery was 2.8 V to 4.25 V.

(2) Test of Bonding Strength of Positive Electrode Plate

A specimen with a width of 0.02 μm and a length of 0.1 μm was taken from a test plate (single-side coated; and in the case of a double-side coated plate, the film on one side thereof could be removed in advance); a dedicated double-sided tape with a width of 0.02 μm and a length of 0.09 μm was attached to a steel plate with a width of 0.02 μm and a length of 0.2 μm, where one end of the double-sided tape was level with one end of the steel plate; the plate specimen was attached to the double-side tape, such that the lithium supplementing layer fitted with the double-sided tape; a paper tape with a width of 0.02 μm and a length of 0.15 μm was fixed to the surface of a current collector of the plate specimen using a masking tape; the end of the steel plate to which the plate is not attached was fixed with a lower fixture of a tensile machine, the paper tape was folded upward and fixed with an upper fixture, and the tensile machine was turned on for 180° continuous peeling at a peeling speed of 0.05 μm/min; and the maximum tension F displayed on the tensile machine was recorded when the film of the plate was peeled from the current collector. Bonding strength (N/m) of the plate=F/Width of the plate specimen.

In the bonding strength test of the positive electrode plates of the examples of the present invention, no peeling occurred between the lithium supplementing layer and the positive electrode active material layer, indicating a high interlayer bonding strength between the lithium supplementing layer and the positive electrode active material layer of the plate. However, in the peeling test process of the plate in which the binder PVDF was used in the lithium supplementing layer (e.g., Comparative examples 1 and 4), peeling occurred between the lithium supplementing layer and the positive electrode active material layer.

TABLE 3

Preparation parameters and test results of Examples 1 to 17 and Comparative examples 1 to 6

| | Relevant preparation parameters of positive electrode plate | | | Performance of secondary battery | |
|---|---|---|---|---|---|
| Serial No. | Binder of lithium supplementing layer | Thickness of lithium supplementing layer [μm] | Thickness proportion of lithium supplementing layer | First discharge gram capacity [mAh/g] | Cycle life [round] |
| Example 1 | Binder A3 | 4.35 | 5% | 149.5 | 5,644 |
| Example 2 | Binder A3 | 7.2 | 8% | 151.4 | 6,015 |
| Example 3 | Binder A3 | 11.3 | 12% | 153.6 | 6,238 |

TABLE 3-continued

Preparation parameters and test results of Examples 1 to 17 and Comparative examples 1 to 6

| Serial No. | Relevant preparation parameters of positive electrode plate: Binder of lithium supplementing layer | Thickness of lithium supplementing layer [μm] | Thickness proportion of lithium supplementing layer | Performance of secondary battery: First discharge gram capacity [mAh/g] | Cycle life [round] |
|---|---|---|---|---|---|
| Example 4 | Binder A3 | 14.61 | 15% | 151.1 | 5,985 |
| Example 5 | Binder A3 | 20.7 | 20% | 148.9 | 5,710 |
| Example 6 | Binder A1 | 11.3 | 12% | 150.8 | 5,930 |
| Example 7 | Binder A2 | 11.3 | 12% | 152.4 | 6,128 |
| Example 8 | Binder A4 | 11.3 | 12% | 152.6 | 6,130 |
| Example 9 | Binder A5 | 11.3 | 12% | 150.2 | 5,835 |
| Example 10 | Binder A6 | 11.3 | 12% | 149.4 | 5,720 |
| Example 11 | Binder A7 | 11.3 | 12% | 149.9 | 5,785 |
| Example 12 | Binder A8 | 11.3 | 12% | 152.2 | 6,120 |
| Example 13 | Binder A9 | 11.3 | 12% | 148.7 | 5,640 |
| Example 14 | Binder A14 | 11.3 | 12% | 151.6 | 6,120 |
| Example 15 | Binder A15 | 11.3 | 12% | 151.8 | 6,125 |
| Example 16 | Binder A16 | 11.3 | 12% | 151.5 | 6,118 |
| Comparative example 1 | Binder D1 | 11.3 | 12% | 142.3 | 5,082 |
| Comparative example 2 | Binder D2 | 11.3 | 12% | 143.4 | 5,150 |
| Comparative example 3 | Binder D3 | 11.3 | 12% | 144.4 | 5,280 |
| Example 17 | Binder A3 | 14.61 | 15% | 197.2 | 2,770 |
| Comparative example 4 | Binder D4 | 14.61 | 15% | 195.2 | 2,670 |
| Comparative example 5 | Binder D5 | 14.61 | 15% | 196.1 | 2,710 |
| Comparative example 6 | Binder D6 | 14.61 | 15% | 196.8 | 2,730 |

It can be seen from the results above that, in Examples 1 to 17, the secondary batteries all obtain a high first discharge capacity and a long cycle life because a lithium supplementing layer is provided on a surface of the positive electrode active material layer opposite to the positive electrode current collector, where the lithium supplementing layer comprises a lithium-rich metal oxide as a lithium supplementing material and a binder A, and the binder A is selected from polymers containing a first monomer unit and a second monomer unit.

By contrast, since Comparative Examples 1 to 6 do not satisfy the present application, both the first discharge capacity and cycle life of the secondary batteries are not effectively improved.

TABLE 4

Preparation parameters and test results of Examples 18 to 20

| | Relevant preparation parameters of positive electrode plate | | Performance of secondary battery | |
|---|---|---|---|---|
| Serial No. | Positive electrode lithium supplementing material | Binder A | First discharge gram capacity [mAh/g] | Cycle life [round] |
| Example 3 | $Li_5FeO_4$ | Binder A3 | 153.6 | 6,238 |
| Example 18 | $Li_3VO_4$ | Binder A10 | 152.8 | 6,180 |
| Example 19 | $Li_3NbO_4$ | Binder A10 | 151.9 | 6,128 |
| Example 20 | $Li_6CoO_4$ | Binder A11 | 154.1 | 6,310 |

It can be seen from the results above that, the use of a suitable positive electrode lithium supplementing material can further improve the first discharge gram capacity and cycle life of the battery.

TABLE 5

Preparation parameters and test results of Examples 21 to 27

| | Relevant preparation parameters of positive electrode plate | | | | | | Performance of secondary battery | |
|---|---|---|---|---|---|---|---|---|
| Serial No. | $D_v50$ of positive electrode lithium supplementing material [μm] | Binder A | Thickness of lithium supplementing layer [μm] | Thickness proportion of lithium supplementing layer | Compacted density of positive electrode active material layer [g/cm$^3$] | Bonding strength of positive electrode plate [N/m] | First discharge gram capacity [mAh/g] | Cycle life [round] |
| Example 21 | 6 | Binder A3 | 11.3 | 12% | 2.43 | 23.2 | 150.5 | 5,810 |
| Example 22 | 10 | Binder A3 | 11.3 | 12% | 2.48 | 25.1 | 152.8 | 6,180 |
| Example 3 | 12 | Binder A3 | 11.3 | 12% | 2.5 | 25.6 | 153.6 | 6,238 |
| Example 23 | 15 | Binder A3 | 11.3 | 12% | 2.47 | 24.6 | 152.5 | 6,130 |
| Example 24 | 20 | Binder A3 | 11.3 | 12% | 2.44 | 23.8 | 150.6 | 5,818 |
| Example 25 | 5 | Binder A5 | 23.35 | 22% | 2.42 | 22.4 | 146.3 | 5,452 |
| Example 26 | 12 | Binder A12 | 2.56 | 3% | 2.41 | 21.8 | 145.1 | 5,670 |
| Example 27 | 25 | Binder A13 | 11.3 | 12% | 2.42 | 22.4 | 145.6 | 5,365 |

It can be seen from the results above that, when the lithium supplementing layer uses a polymer containing a first monomer unit and a second monomer unit as a binder A, and the positive electrode lithium supplementing material is monocrystal particles with an appropriate particle size, it is helpful in improving the compacted density of the positive electrode active material layer, thereby improving the energy density of the battery. And also, the positive electrode plate can also obtain a high bonding strength and thus high electrical conductivity, thereby improving the cycle life of the battery.

TABLE 6

Preparation parameters and test results of Examples 28 to 45

| | Relevant preparation parameters of positive electrode plate | | | | | | | |
|---|---|---|---|---|---|---|---|---|
| | Positive electrode active material layer | | | | Compacted density of positive electrode | Bonding strength of | Performance of secondary battery | |
| Serial No. | Positive electrode active material | Binder B | Binder C | Content of binder C | active material layer [g/cm$^3$] | positive electrode plate [N/m] | First discharge gram capacity [mAh/g] | Cycle life [round] |
| Example 28 | LFP | PVDF | Binder C3 | 5% | 2.48 | 28.0 | 152.8 | 6,620 |
| Example 29 | LFP | PVDF | Binder C3 | 8% | 2.5 | 28.6 | 153.6 | 6,650 |
| Example 30 | LFP | PVDF | Binder C3 | 10% | 2.49 | 28.1 | 153.1 | 6,540 |
| Example 31 | LFP | PVDF | Binder C3 | 15% | 2.47 | 27.6 | 152.5 | 6,480 |
| Example 32 | LFP | PVDF | Binder C1 | 8% | 2.42 | 25.7 | 146.3 | 6,310 |
| Example 33 | LFP | PVDF | Binder C2 | 8% | 2.43 | 26.1 | 147.1 | 6,230 |
| Example 34 | LFP | PVDF | Binder C4 | 8% | 2.45 | 26.8 | 149.2 | 6,350 |
| Example 35 | LFP | PVDF | Binder C6 | 8% | 2.44 | 26.0 | 147.8 | 6,280 |
| Example 36 | LFP | PVDF | Binder C8 | 8% | 2.4 | 25.6 | 145.2 | 6,130 |
| Example 37 | NCM811 | PVDF | Binder C9 | 5% | 3.52 | 25.7 | 198 | 2,815 |
| Example 38 | NCM811 | PVDF | Binder C9 | 10% | 3.55 | 26.7 | 199.1 | 2,905 |
| Example 39 | NCM811 | PVDF | Binder C9 | 15% | 3.6 | 28.1 | 201.2 | 3,010 |
| Example 40 | NCM811 | PVDF | Binder C9 | 20% | 3.56 | 27.7 | 199.6 | 2,920 |
| Example 41 | NCM811 | PVDF | Binder C7 | 15% | 3.53 | 26.2 | 198.4 | 2,845 |
| Example 42 | NCM811 | PVDF | Binder C8 | 15% | 3.57 | 27.6 | 200.1 | 2,970 |
| Example 43 | NCM811 | PVDF | Binder C10 | 15% | 3.58 | 28.8 | 200.8 | 3,000 |
| Example 44 | NCM811 | PVDF | Binder C11 | 15% | 3.54 | 26.8 | 198.8 | 2,885 |
| Example 45 | NCM811 | PVDF | Binder C5 | 15% | 3.5 | 26.5 | 197.6 | 2,790 |

As can be seen from the results above, the cycle life of the secondary battery can be further improved by using a binder A in the lithium supplementing layer and adding an appropriate proportion of a binder C to the positive electrode active material layer.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. A positive electrode plate, comprising a positive electrode current collector, a positive electrode active material layer provided on at least one surface of the positive electrode current collector, and a lithium supplementing layer provided on a surface of the positive electrode active material layer opposite to the positive electrode current collector,

- wherein the lithium supplementing layer comprises a positive electrode lithium supplementing material, a conductive agent and a binder A,
- the positive electrode lithium supplementing material comprises a lithium-rich metal oxide, and
- the binder A is selected from polymers containing a first monomer unit shown by a formula I and a second monomer unit shown by a formula II,

I

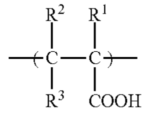

II

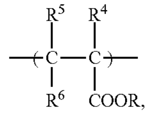

- wherein the $R^1$, $R^2$, $R^3$, $R^4$, $R^5$ and $R^6$ are each independently selected from hydrogen or substituted or unsubstituted C1 to C8 alkyl, and the R is selected from substituted or unsubstituted C1 to C8 alkyl, a weight-average molecular weight of the binder A is 30,000 to 600,000 g/mol,
- wherein a weight proportion of the positive electrode lithium supplementing material in the lithium supplementing layer is 90% to 97%, a weight proportion of the binder A in the lithium supplementing layer is 2% to 7%, a weight proportion of the conductive agent in the lithium supplementing layer is 1% to 3%,
- wherein the positive electrode active material layer comprises a positive electrode active material, a binder B and a binder C, wherein
- the binder B comprises one or more of polyvinylidene fluoride PVDF and polytetrafluoroethylene PTFE;
- the binder C is selected from polymers containing one or more from a group consisting of a third monomer unit shown by a formula III and a fourth monomer unit shown by a formula IV,

III

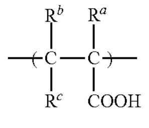

IV

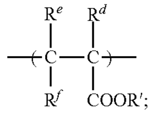

- wherein the $R^a$, $R^b$, $R^c$, $R^d$, $R^e$ and $R^f$ are each independently selected from hydrogen or substituted or unsubstituted C1 to C8 alkyl, and the R' is selected from substituted or unsubstituted C1 to C8 alkyl, a weight-average molecular weight of the binder C is 50 to 5,000 g/mol,
- wherein, based on a total weight of the binder B and binder C, a content of the binder Cis 5% to 20%.

2. The positive electrode plate according to claim 1, wherein based on a total weight of the first monomer unit and second monomer unit, a content of the first monomer unit is 30% to 70%.

3. The positive electrode plate according to claim 1, wherein a weight-average molecular weight of the binder A is 100,000 to 300,000 g/mol.

4. The positive electrode plate according to claim 1, wherein the first monomer unit satisfies that: the $R^1$, $R^2$ and $R^3$ are each independently selected from hydrogen or substituted or unsubstituted C1 to C4 alkyl, and optionally, the $R^1$, $R^2$ and $R^3$ are each independently selected from hydrogen or methyl; optionally, the first monomer unit comprises one or more of the monomer units shown by a formula S1 and a formula S2,

S1

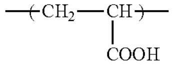

S2

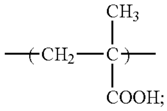

and/or,

- the second monomer unit satisfies that: the R is selected from substituted or unsubstituted C1 to C4 alkyl; and/or, the $R^4$, $R^5$ and $R^6$ are each independently selected from hydrogen or substituted or unsubstituted C1 to C4 alkyl, and optionally, the second monomer unit comprises one or more monomer units shown by a formula S3-S8:

S3

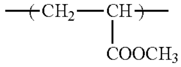

S4

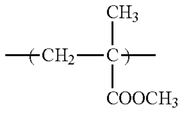

S5

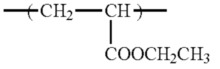

S6

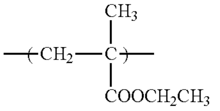

S7

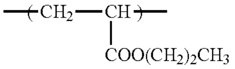

S8

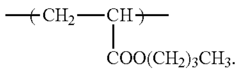

5. The positive electrode plate according to claim 4, wherein the binder A is selected from one or more of a polymer containing monomer units S1 and S5, a polymer containing monomer units S1 and S8, a polymer containing monomer units S1, S5 and S8, a polymer containing monomer units S1, S3, S5 and S8, a polymer containing monomer units S2 and S8, a polymer containing monomer units S2 and S7, a polymer containing monomer units S2 and S5, and a polymer containing monomer units S2 and S6.

6. The positive electrode plate according to claim 1, wherein the pH of a solution of the positive electrode lithium supplementing material measured by a titration method in which 30 g of the positive electrode lithium supplementing material is added into 100 mL of deionized water is ≤13.

7. The positive electrode plate according to claim 1, wherein a gram capacity of the positive electrode lithium supplementing material is ≥400 mAh/g, and optionally ≥500 mAh/g; optionally, the lithium-rich metal oxide is selected from one or more of $Li_3M^1O_4$, $Li_5M^2O_4$ and $Li_6M^3O_4$, wherein $M^1$ comprises one or more of V, Nb, Cr and Mo, $M^2$ comprises one or more of Fe, Cr, V, Mo and Al, $M^3$ comprises one or more of Co, V, Cr and Mo, and the valence of each metal element except Li in the lithium-rich metal oxide is lower than its own highest oxidation valence.

8. The positive electrode plate according to claim 1, wherein the lithium-rich metal oxide comprises monocrystal particles, and a number proportion of the monocrystal particles in the lithium-rich metal oxide is 60% to 100%.

9. The positive electrode plate according to claim 1, wherein a volume-average particle size $D_v50$ of the lithium-rich metal oxide is 5 μm to 25 μm.

10. The positive electrode plate according to claim 1, wherein the third monomer unit comprises one or more of the monomer units shown by the formulas S1 and S2, and the fourth monomer unit comprises one or more of the monomer units shown by the formulas S3 to S8,

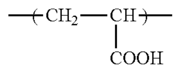
S1

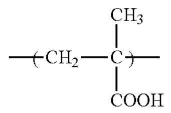
S2

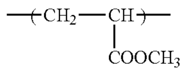
S3

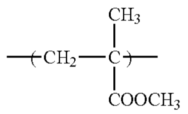
S4

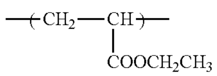
S5

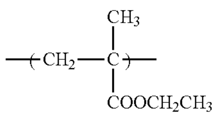
S6

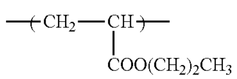
S7

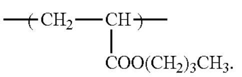
S8

11. The positive electrode plate according to claim 1, wherein in the positive electrode active material layer, the positive electrode active material comprises a layered lithium transition metal oxide, and optionally, the layered lithium transition metal oxide comprises one or more of a lithium-nickel-cobalt-manganese oxide, a lithium-nickel-cobalt-aluminum oxide and modified materials of the foregoing substances;

wherein based on a total weight of the binder B and binder C, a content of the binder Cis 10% to 20%.

12. The positive electrode plate according to claim 11, wherein a weight-average molecular weight of the binder C is 1000 to 3000 g/mol.

13. The positive electrode plate according to claim 11, wherein the binder C is selected from polymers containing one or more of the third monomer units.

14. The positive electrode plate according to claim 11, wherein the compacted density of the positive electrode active material layer is 3.5 $g/cm^3$ to 3.8 $g/cm^3$;

wherein a volume-average particle size $D_v50$ of the positive electrode active material is 2 μm to 10 μm.

15. The positive electrode plate according to claim 1, wherein in the positive electrode active material layer, the positive electrode active material comprises a polyanion-type positive electrode material;

wherein based on a total weight of the binder B and binder C, a content of the binder Cis 5% to 10%; and wherein a weight-average molecular weight of the binder Cis 100 to 3000 g/mol.

16. The positive electrode plate according to claim 15, wherein the binder C is selected from polymers containing both the third monomer unit and the fourth monomer unit; and optionally, the binder C is selected from one or more of polymers containing at least one selected from the monomer units S1 to S2 and at least one selected from S2 to S8.

17. The positive electrode plate according to claim 15, wherein the compacted density of the positive electrode active material layer is 2.4 $g/cm^3$ to 2.7 $g/cm^3$, and optionally 2.45 $g/cm^3$ to 2.55 $g/cm^3$;

wherein a volume-average particle size $D_v50$ of the positive electrode active material is 0.2 μm to 1.5 μm, and optionally 0.5 μm to 1.2 μm.

18. The positive electrode plate according to claim 1, wherein based on the total thickness of the positive electrode active material layer and the lithium supplementing layer, the thickness proportion of the lithium supplementing layer is 3% to 22%, optionally 5% to 20%, and still optionally 8% to 15%.

19. A secondary battery, comprising a positive electrode plate according to claim 1 and an electrolyte solution, wherein the electrolyte solution comprises an electrolyte lithium salt, and the electrolyte lithium salt comprises a fluorine-containing electrolyte lithium salt; and optionally, the fluorine-containing electrolyte lithium salt is selected from one or more of lithium hexafluorophosphate, lithium tetrafluoroborate, lithium difluoro (oxalato) borate, lithium difluorophosphate, lithium difluorobis(oxalate)phosphate, lithium tetrafluoro (oxalato)phosphate, lithium Bis(fluorosulfonyl)imide, lithium bis(trifluoromethanesulfonyl)imide, lithium trifluoromethanesulfonate, lithium bis(trifluoromethanesulfonyl) methide and lithium tris(trifluoromethanesulfonyl) methide.

20. A positive electrode plate, comprising a positive electrode current collector, a positive electrode active material layer provided on at least one surface of the positive electrode current collector, and a lithium supplementing layer provided on a surface of the positive electrode active material layer opposite to the positive electrode current collector, wherein the lithium supplementing layer comprises a positive electrode lithium supplementing material, a conductive agent, and a binder A, a weight proportion of the positive electrode lithium supplementing material in the lithium supplementing layer is 90% to 97%, a weight proportion of the binder A in the lithium supplementing layer is 2% to 7%, a weight proportion of the conductive agent in the lithium supplementing layer is 1% to 3%, wherein the positive electrode active material layer comprises a positive electrode active material, a binder B and a binder C, the positive electrode active material comprises one or more selected from a lithium-nickel-cobalt-manganese oxide and a lithium-nickel-cobalt-aluminum oxide, the binder B comprises one or more of polyvinylidene fluoride PVDF and polytetrafluoroethylene PTFE, the binder C is one or more selected from a polymer of monomer unit S1, a polymer of monomer units S1 and S7, a polymer of monomer units S1 and S6, and a polymer of monomer units S2 and S7, a weight-average molecular weight of the binder Cis 50 g/mol to 5,000 g/mol, and based on a total weight of the binder B and binder C, a content of the binder Cis 5% to 20%, wherein the positive electrode lithium supplementing material comprises a lithium-rich metal oxide, the lithium-rich metal oxide comprises one or more selected from $Li_3M^1O_4$, $Li_5M^2O_4$ and $Li_6M^3O_4$, wherein $M^1$ comprises one or more selected from V, Nb, Cr and Mo, $M^2$ comprises one or more selected from Fe, Cr, V, Mo and Al, $M^3$ comprises one or more selected from Co, V, Cr and Mo, and a valence of each of $M^1$, $M^2$, and $M^3$ in the lithium-rich metal oxide is lower than a highest oxidation valence thereof, wherein the binder A is one or more selected from a polymer of monomer units S1 and S5, a polymer of monomer units S1 and S8, a polymer of monomer units S1, S5 and S8, a polymer of monomer units S1, S3, S5 and S8, a polymer of monomer units S2 and S8, a polymer of monomer units S2 and S7, a polymer of monomer units S2 and S5, and a polymer of monomer units S2 and S6, a weight-average molecular weight of the binder A is 30,000 g/mol to 600,000 g/mol,

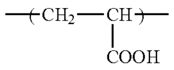
S1

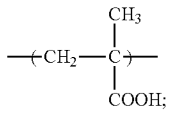
S2

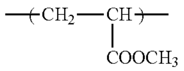
S3

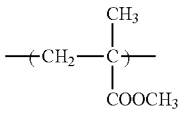
S4

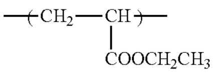
S5

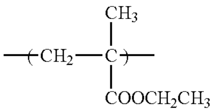
S6

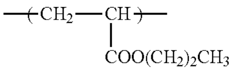
S7

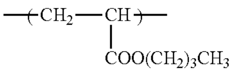
S8

* * * * *